United States Patent
Kjonaas et al.

(10) Patent No.: US 6,223,983 B1
(45) Date of Patent: May 1, 2001

(54) INTERACTIVE POINT ACCESS FINANCIAL AND INFORMATION SYSTEM

(75) Inventors: Donald W. Kjonaas; David L. Andreas, both of Minneapolis, MN (US)

(73) Assignee: National City Bank, Minneapolis, MN (US)

( * ) Notice: Subject to any disclaimer, the term of this patent is extended or adjusted under 35 U.S.C. 154(b) by 0 days.

(21) Appl. No.: 09/252,834

(22) Filed: Feb. 19, 1999

(51) Int. Cl.$^7$ .................................................. G06F 17/60
(52) U.S. Cl. ............................................. 235/379; 705/42
(58) Field of Search ....................... 235/379–381; 902/8, 9, 14; 705/42–44; 379/90.01, 93.25

(56) References Cited

U.S. PATENT DOCUMENTS

| | | | |
|---|---|---|---|
| 5,600,114 | | 2/1997 | Dunlap ................................. 235/379 |
| 5,604,341 | * | 2/1997 | Grossi et al. ......................... 235/379 |
| 5,661,283 | * | 8/1997 | Gallacher et al. .................... 235/379 |
| 5,901,204 | * | 5/1999 | Gallacher et al. ................. 379/90.01 |
| 6,021,400 | * | 2/2000 | Gallacher et al. ..................... 705/43 |

FOREIGN PATENT DOCUMENTS 9908215  2/1999  (WO) .

OTHER PUBLICATIONS

Redman, Russell. "Mellon to Upgrade Supermarket Sites," Bank Systems+Technology, Mar. 1997, p. 9.

Duhamel, Amie. "Banking On Invention," Minnesota Business & Opportunities, Mar. 1998, pp. 40–41.

Hatch Woodward, Nancy. "Banking on Convenience: The Plus Side of Workplace ATMs,"H R Magazine, Sep. 1998, pp. 73–81.

Wintroub Calmenson, Diane. "Bank–O–Matic," Interiors & Sources, May 1998, pp. 94–100.

* cited by examiner

Primary Examiner—Thien M. Le
(74) Attorney, Agent, or Firm—Patterson, Thuente, Skaar & Christensen, P.A.

(57) ABSTRACT

The invention relates to a remote interactive point access banking and information system. Particularly, the invention discloses an integrated set of platforms presenting various service and transaction options to a customer. The invention enables a customer to access personal account information, apply for a loan, make commercial deposits and videoconference, in real-time, with a bank representative at the main office. A software implemented in preferably a mainframe computer provides direct access to the bank's database to which a customer is able to connect to execute transactions. One of the many aspects of the invention includes a plurality of platforms integrated to provide the customer with a full banking service such that the customer is enabled to access and execute all major transactions including internet and fax communications. The invention further provides the customer with information regarding banking services, other investment and finance related intelligence. The invention is modular and expandable to be compatible to emerging technologies such as the internet/intranet, cellular systems and high bandwidth digital communications so that both individual and institutional customers may be able to access full banking services from remote locations. Further, the invention is expandable to enable customers to access their account and execute transactions via the internet worldwide.

19 Claims, 30 Drawing Sheets

SCALE: 1/4=1'-0"

SCALE: 1/4=1'-0"

SCALE: 1/4=1'-0"

SCALE: 1/4=1'-0"

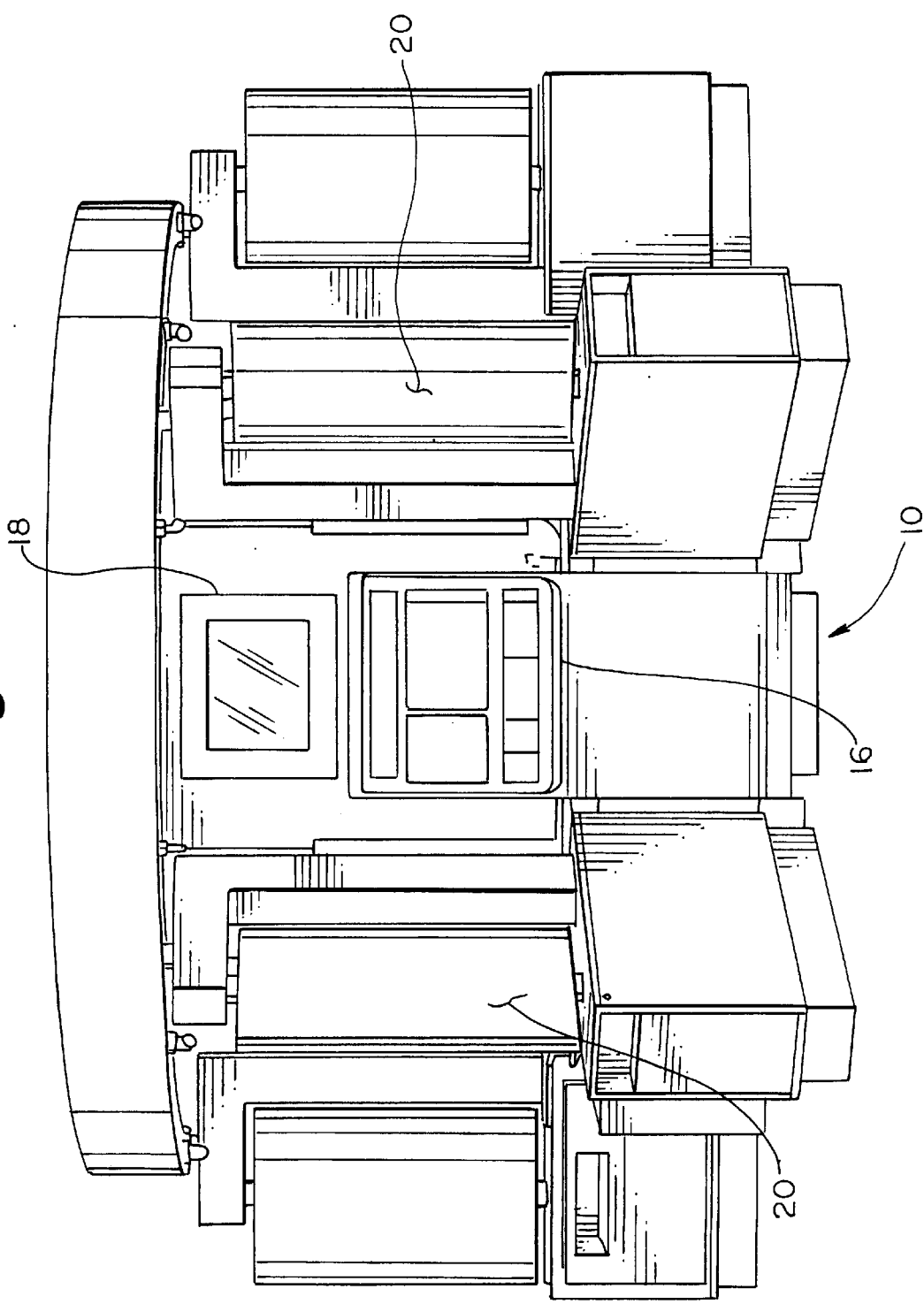

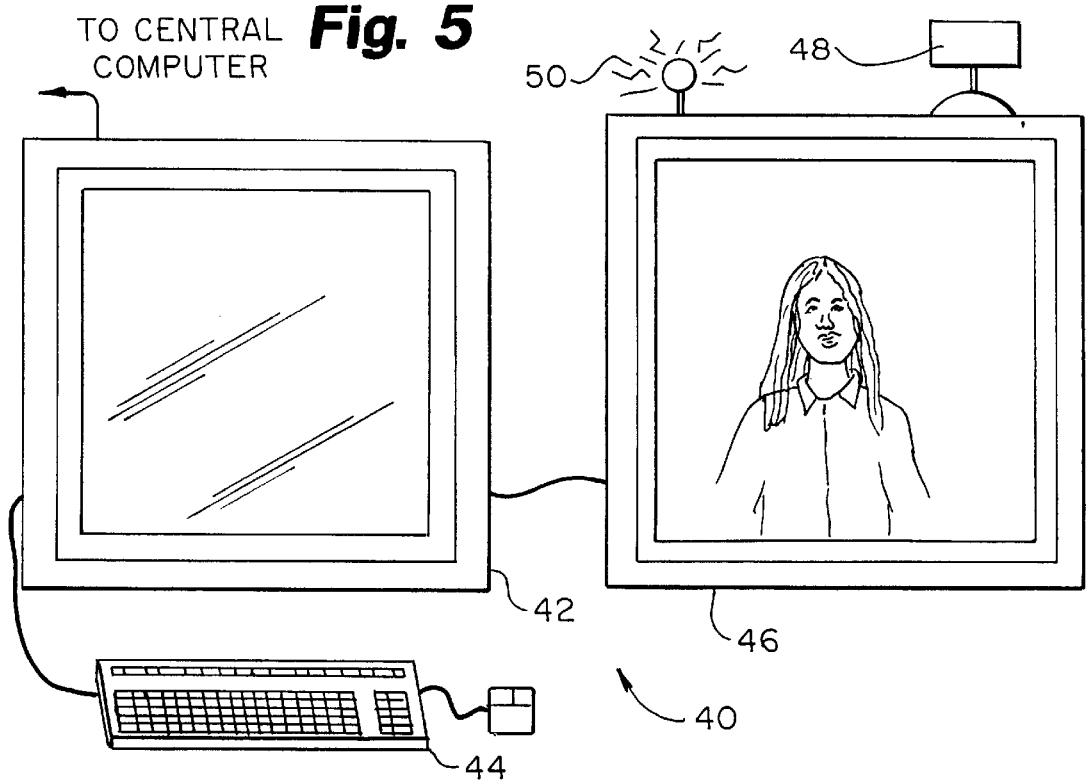
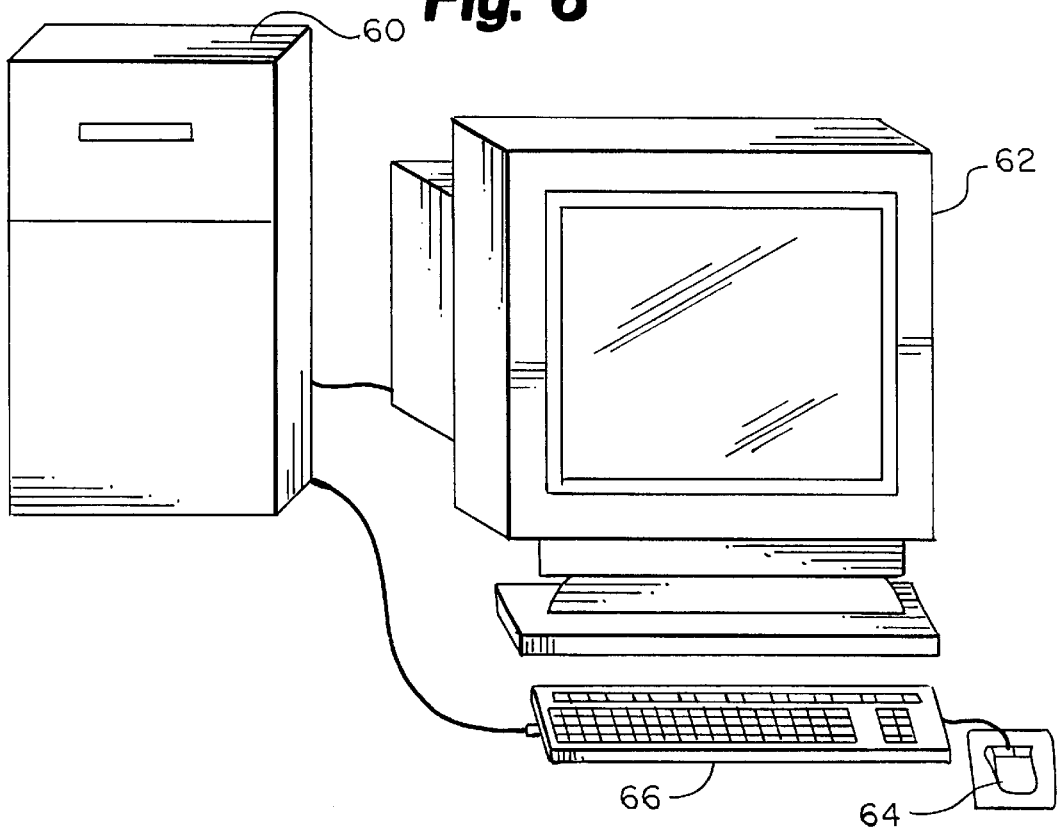

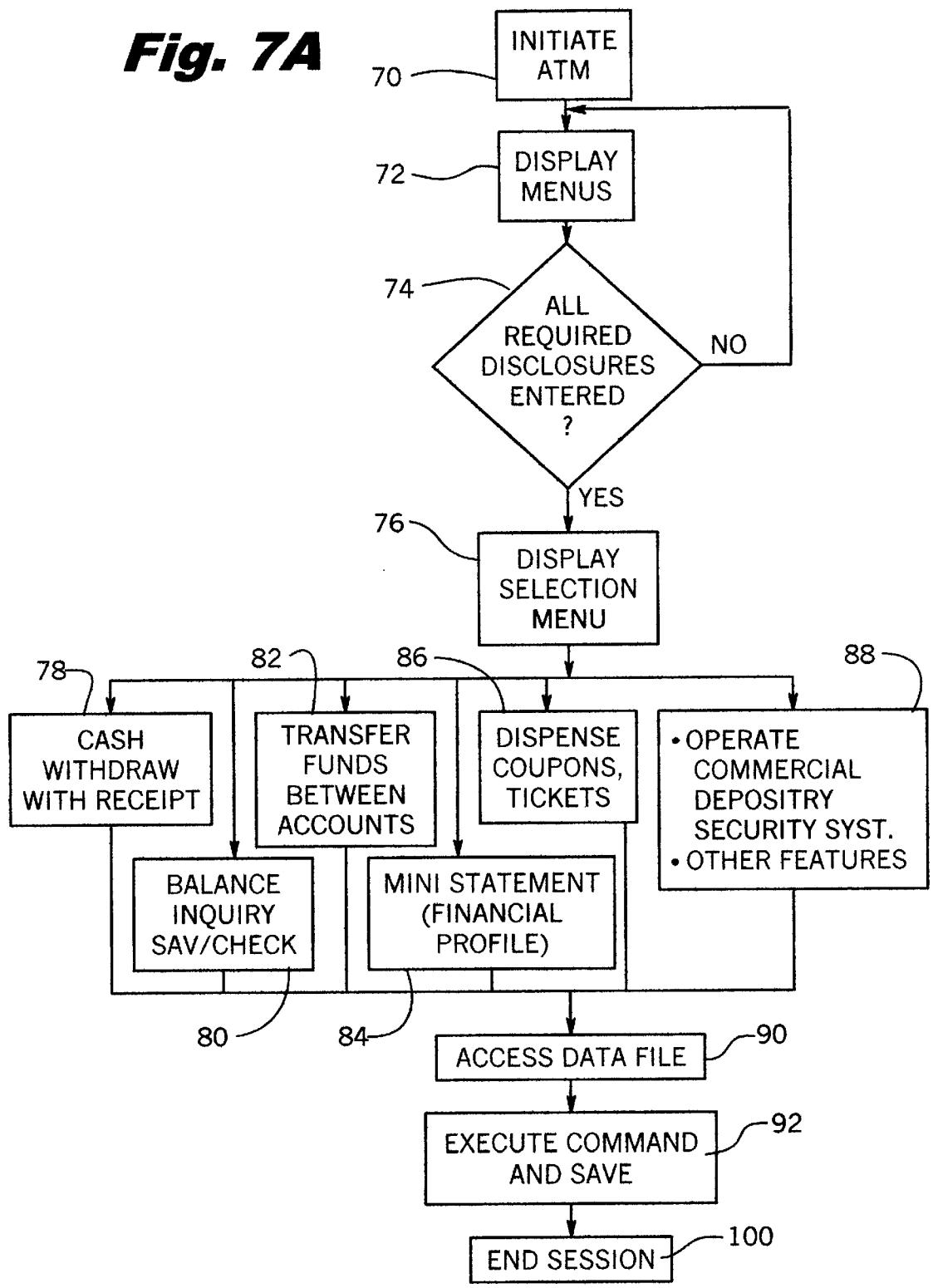

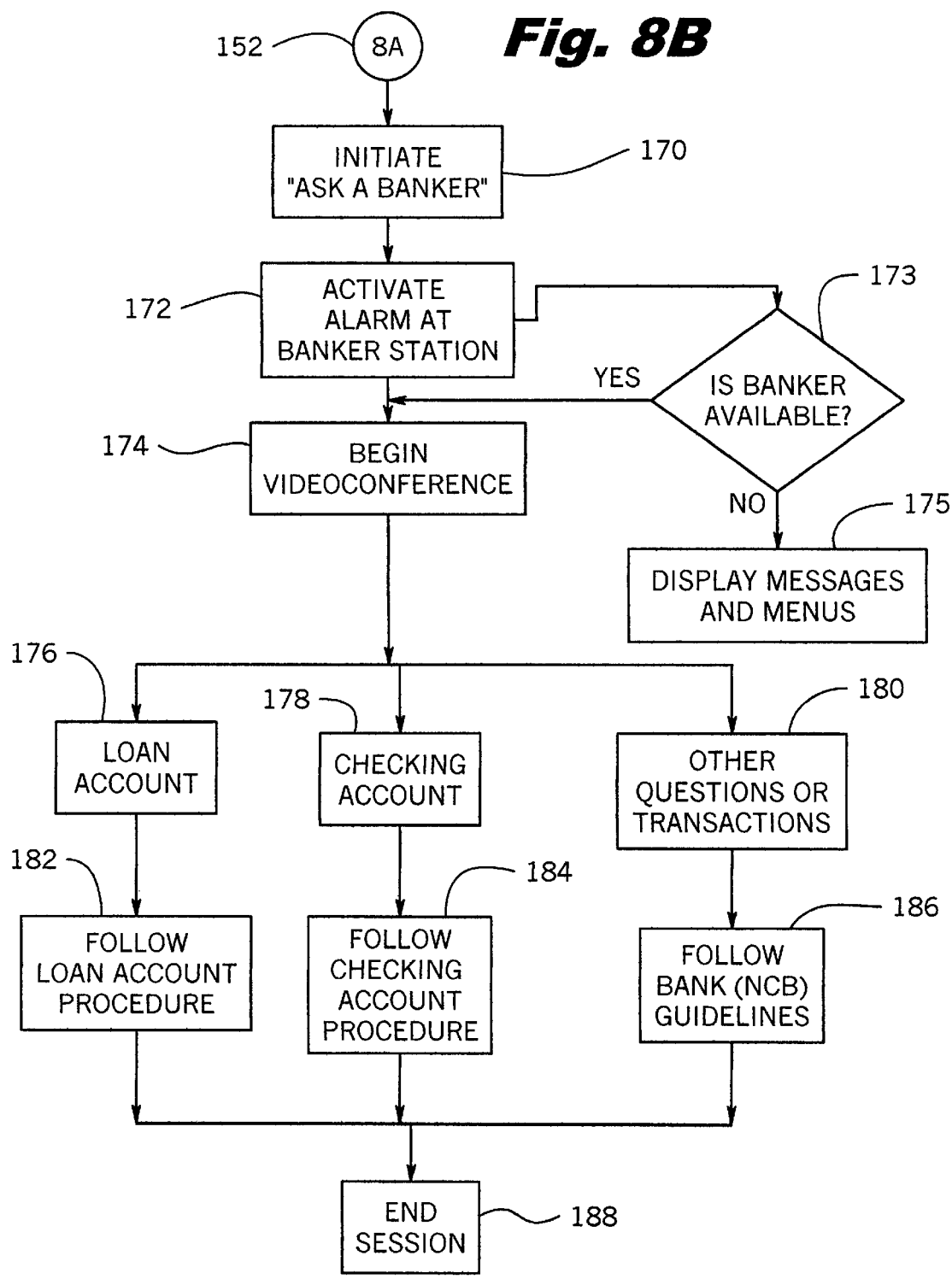

Fig. 9E

```
FUNDING WILL OCCUR WHEN ALL ORIGINALLY
SIGNED DOCUMENTATION IS
RETURNED/DELIVERED TO THE RELATIONSHIP
DEVELOPER.
        │
        ▼
RELATIONSHIP DEVELOPER
FUNDS LOAN PROCEEDS TO
A NATIONAL CITY BANK
ACCOUNT IN MOST INSTANCES.
(CASHIER'S CHECK ISSUED
FOR PURCHASE MONEY
TRANSACTIONS.)
        │
        ▼
RELATIONSHIP DEVELOPER
PREPARES THE THANK YOU
PACKAGE FOR THE BORROWER
        │
        ▼
RELATIONSHIP DEVELOPER FORWARDS
APPROPRIATE DOCUMENTS
TO LOAN INFORMATION
PROCESSING FOR BOOKING
AND FUNDING.
```

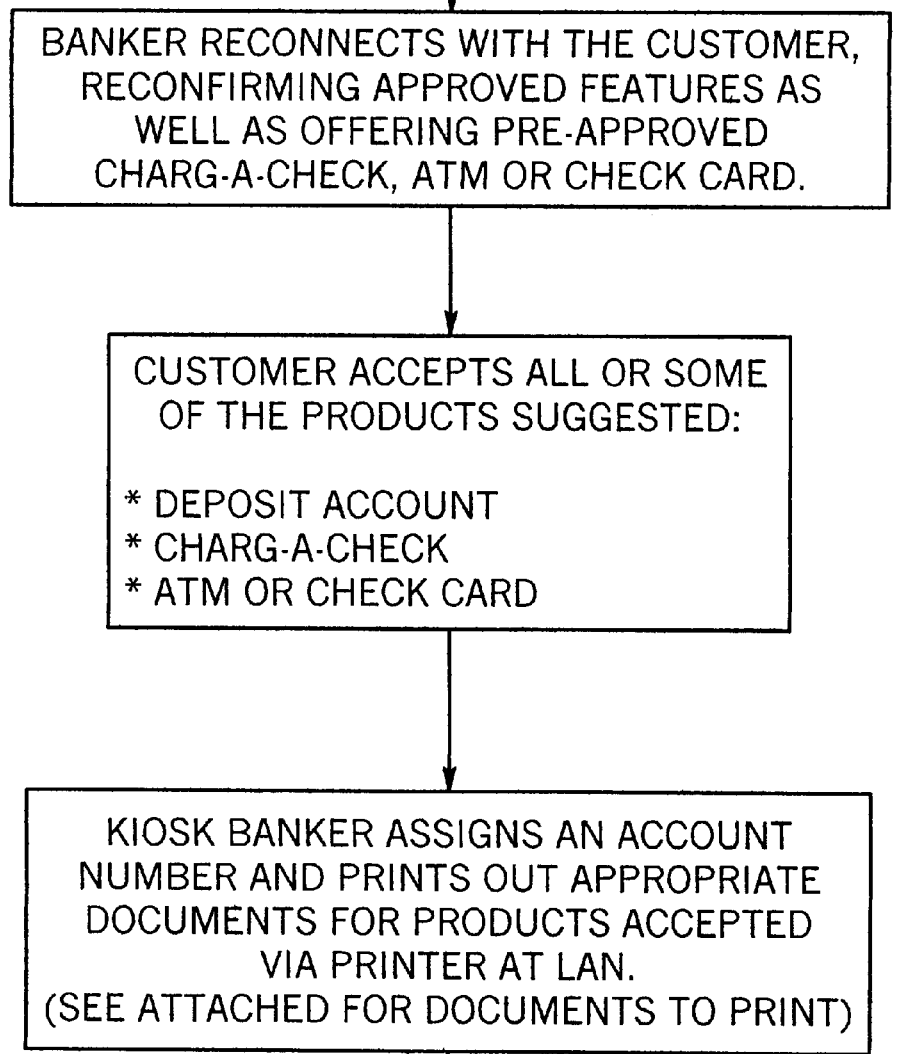

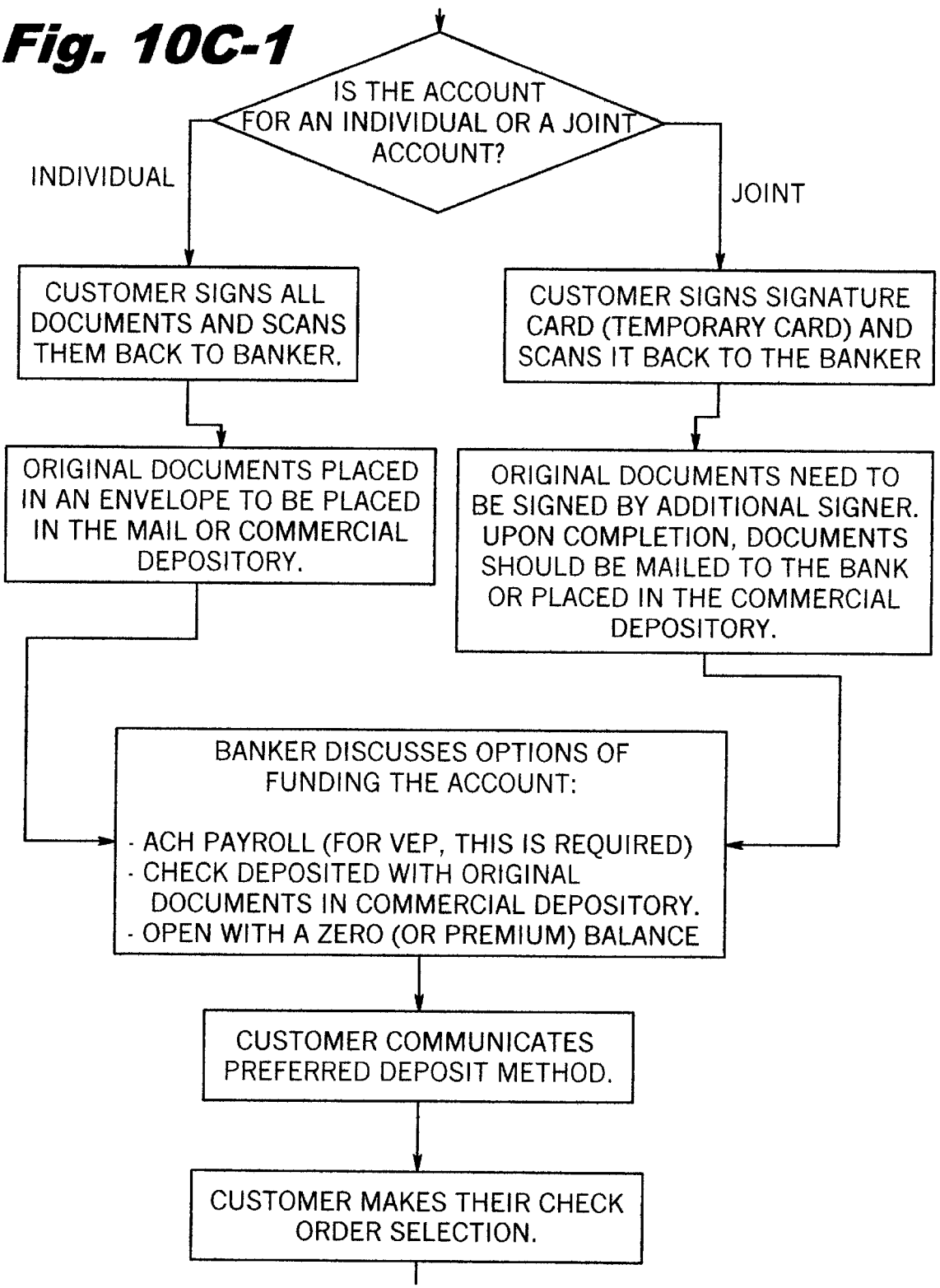

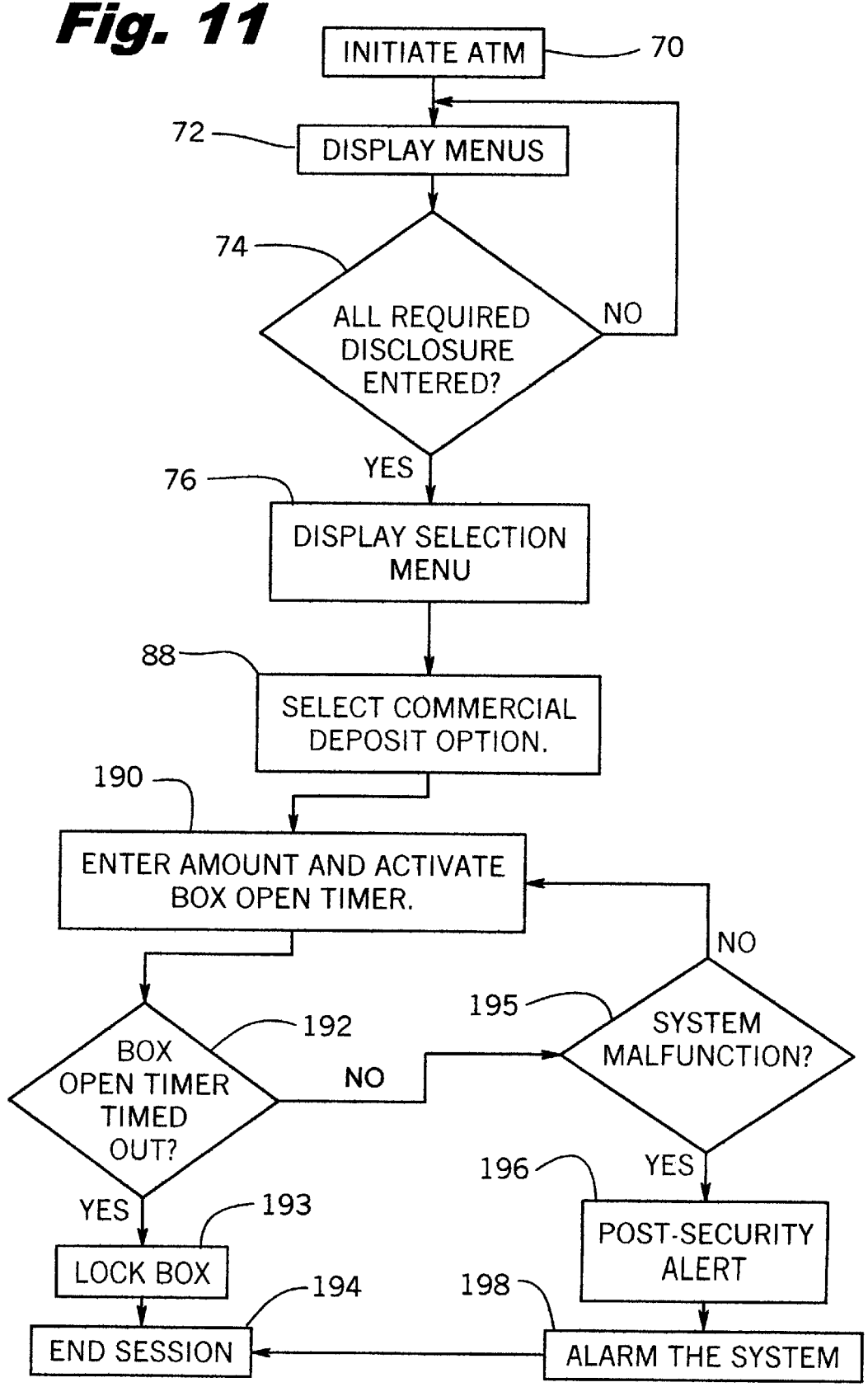

INTERACTIVE POINT ACCESS FINANCIAL AND INFORMATION SYSTEM

BACKGROUND OF THE INVENTION

1. Field of the Invention

The present invention generally relates to a method and apparatus for a remote interactive point access financial and information system implemented to provide an integrated platform of services including videoconferencing, a customized automated teller machine (ATM) and commercial depository. The system provides a full service virtual bank to a customer and enables transactional engagement, remotely, on a demand basis at high levels of availability, preferably, seven days a week, 24 hours a day. Specifically, the videoconferencing unit is integrally implemented to provide real-time, face-to-face sessions with a bank representative based on audio-visual communications and interface remotely initiable by the customer. More specifically, the system enables the customer to access and execute all major transactions on a demand basis including withdrawals, deposits, loans and investment information and further serves as a medium for information from multiple sources.

2. Description of Related Art

The use of a remotely installed access banking center (ABC), such as an ATM, is well known in the prior art. Particularly in the last decade, ATMs have evolved as a preferred center for consumers to remotely withdraw monies and execute specialized deposits. While each ATM is tailored to comply with certain marketing and service objectives of the proprietary institution the structural organization including the technology of ATMs remain generally familiar and unchanged.

It is well known that commercial banks operate in a highly competitive environment. The popularity of ATMs has prompted a proliferation of remote services including small staff offices located in strategic consumer-frequented forums such as supermarkets, theaters, shopping malls, airports and similar locations. These small offices operate as extensions of the main office and serve customers on site to execute various transactions which are not normally handled by an ATM. Accordingly, the competitive imperatives and consumer preferences impose an increasing demand to access the full service of a personal bank, on a year round 24-hour basis, at a remote location. In this regard, the small extension offices are not only limited in number, availability and the type of services they could provide but are also labor intensive and not conducive to a broad network and universal distribution of remote ABCs.

There is a paradigm shift in remote banking services. This is primarily driven by technology and customers' preference to execute personal banking and financial transactions at a place close, for example, to their residence, work place, shopping, entertainment and or travel location. High speed digital communications including advances in data, image transfer/exchange and the internet have empowered customers to have virtual access and command of their bank and investment accounts. A more likely future development is to enable customers to have remote access to a full banking service via the internet. Yet another likely future development may include the use of a digital cellular phone which incorporates a modem and a PC function to remotely access full banking services and may be a feasible medium for remote video teleconferencing.

While some of these developing technologies are set to change the nature of personal banking services, current methods remain for the most part limited to ATMs and low level technology-based peripheral services. For example the only current method for a user/customer to access account information or to make a transaction, is to call the bank via a phone or to use Infobank[SM].

Accordingly, there is a need to provide a remote banking station with comprehensive features to enable timely and efficient access for customers to banking services including provision of information on investment and related products.

SUMMARY OF THE INVENTION

It is an object of the present invention to provide an interactive point access financial services, transaction, investment and information system structured to be modularly expandable. The system preferably includes, inter alia, a remote ATM, videoconferencing, information and data displays and commercial depository platforms structured to enable a customer to remotely access and execute a number of desired transactions including deposits, withdrawals, loans and further interact with a bank representative in real time.

It is yet another object of the invention to provide an interactive point access financial and information system for processing banking transactions to enable at least one customer and a banker to remotely exchange real-time data, sound and image to process transactions based on the customer's choices. The system includes modularly structured and integrated platforms at the customer station. These platforms are independently activated by the customer to access and execute various transactions. Specifically, the customer is able to access an ATM with customized features, a night depository and a videoconferencing system. Further, the remote station is equipped with interactive information resources selectively operable by the remote customer.

Yet a further object of the invention includes a virtual financial services system including a virtual retail work station wherein an ATM, a commercial depository, a videoconferencing module, information and transaction platforms are integrated to provide an expandable interactive banking module. The system is operated by a computer-implemented software which enables direct access to data and transactions by the customer. Specifically, the customer is enabled to remotely process checking accounts, use a cash card or check card, Charge a check[SM], use Infobank[SM], check order/reorder, execute direct deposit authorization, access saving account information and review personal financial profiles. Further new account applications may be submitted using a scanner. The scanner is also implemented to remotely submit identification and similar information to enhance remote security and promote remote processing of applications and transactions which require personal identification. Accounts may be opened with a zero balance. Deposits may be made through direct deposit options or via the commercial depository with the original documents from the account opening.

Another object of the present invention includes an interactive video conferencing system which enables face-to-face interview and conversation with a bank representative. The system includes after hour message features which enable customers to leave messages for future contact with bank representatives. Generally, the videoconferencing system incorporates video and sound processing systems including a telephone receiver, a scanner and printer at the customer station. Further, at the representative station in the bank, the video conferencing system includes an alert system to indicate to the representative the presence of a customer at the remote station, a video and sound processing system, and a printer. The representative may assist the remote customer in opening new deposit accounts, assist in direct deposit capability, reorder checks, provide general information regarding loans, forward loan application for completion, discuss additional product offerings of the bank and answer customer service related questions. The system also incorporate on screen information regarding the bank's new products and services and further incorporates a deposit and loan calculator. In the event the representative is not available to the customer a menu option presents a split screen to enable the customer to submit personal data, such as e-mail address for example, so that a banker may contact the client at a later time.

It is yet another object of the present invention to provide an ATM machine with enhanced features to cooperate with the other elements of the invention. Some of the major features of the ATM include cash withdrawal, deposits and provision of coupons for the bank products or services. The ATM also includes enhanced features such as dispensing event tickets, discount coupons or similar promotional literature.

Yet another object of the present invention is to provide a commercial depository with a primary use for corporate, business or institutional depositors and a secondary use as a drop off for original documents relating to consumer transactions such as account application.

Specific advances, features and advantages of the present invention will become apparent upon examination of the following description and drawings dealing with several specific embodiments thereof.

BRIEF DESCRIPTION OF THE DRAWINGS

FIG. 5 is a representative layout of the embodiment of a station in the bank;

FIG. 6 is a conceptual outline of the implementation of the present invention in a computer;

FIGS. 7A and 7B represent a flow chart of the high level software logic for the enhanced ATM and the display at the monitor respectively;

FIGS. 8A and 8B represent a flow chart of the high level software logic for the videoconferencing system at the customer station and the bank representative station, respectively;

FIGS. 9A, 9B, 9C, 9D and 9E represent new loan account opening work flow process in accordance with the present invention;

FIG. 11 is a flow chart representing the high level logic of a commercial deposit.

DESCRIPTION OF THE PREFERRED EMBODIMENT

Figures 1, 1A:
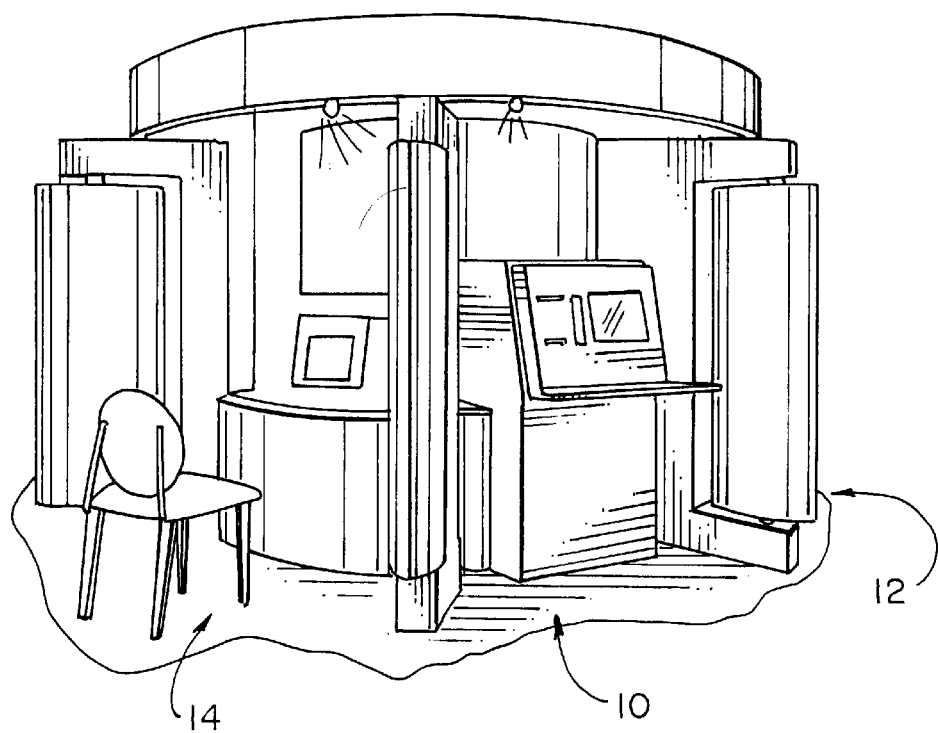
FIG. 1A is a frontal elevation view and a plan view presenting a modular structure of the present invention.

The present invention provides a remote banking station to enable customers to access full banking and financial services. With reference to FIG. 1, the invention is modularly structured and provides an enhanced ATM platform 10, a commercial deposit platform 12 and a videoconferencing platform 14. Each platform is independently accessible to serve a plurality of customers. The system is space and volume optimized to fit in malls, stores, airports, hotels and any public places frequented by current or potential customers.

Figures 1, 1A, 2:
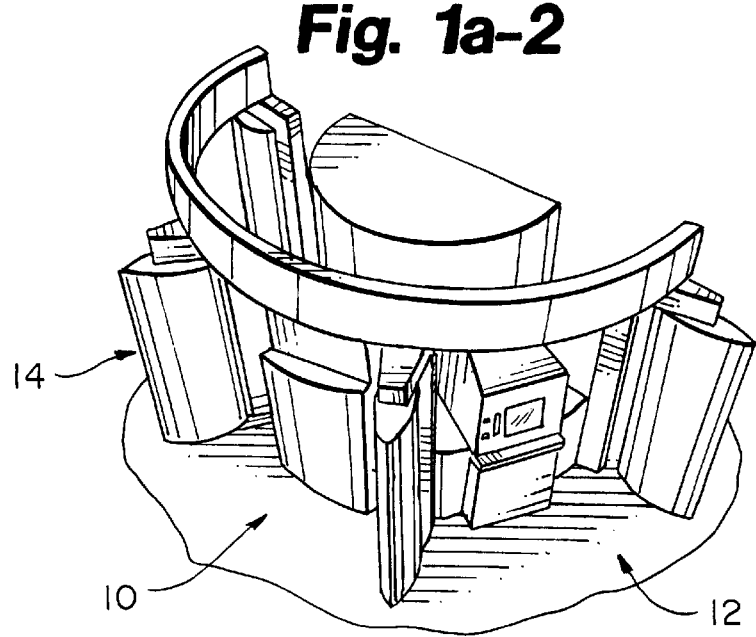
FIG. 2 is an elevation view of an enhanced ATM platform embodiment in accordance with e present invention.

A more detailed representation of customized ATM platform 10 is shown in FIG. 2. The platform includes ATM 16 and information screen 18. ATM 16 includes a custom design screen with several features. ATM 16 advantageously provides, inter alia, cash withdrawal with receipt, deposit with receipt, balance enquiry for checking or savings, and fund transfers between various accounts including checking and savings. Information screen/monitor 18 provides continuous and customer responsive information relating to stock quotes, time and temperature, news highlights, breaking news (national and international), other bank specific information such as rates, ads/posters, videos, product specials, promotions, product service seminars and product data. Further, side panels 20 provide space for advertising and announcements. The displayed data on screen 18 is preferably customer interactive and provides the customer with options to select and review information as needed. As will be discussed hereinbelow, data on screen 18 is preferably updated from a central location and includes a capability to tailor various market specific messages for simultaneous broadcast to several remote bank stations at different locations. ATM 16 advantageously provides the customer with hitherto unavailable options. For example, upon initiation by the customer, a mini-statement showing deposits, checks cleared, ATM and electronic transactions can be obtained. Further, ATM 16 is equipped to advantageously dispense event tickets, promotional coupons and the like at the customers' request. Furthermore, ATM 16 includes menus that are internet/intranet compatible to enable the customer to access accounts and conduct transactions as needed.

Figures 1, 1A, 2, 3:
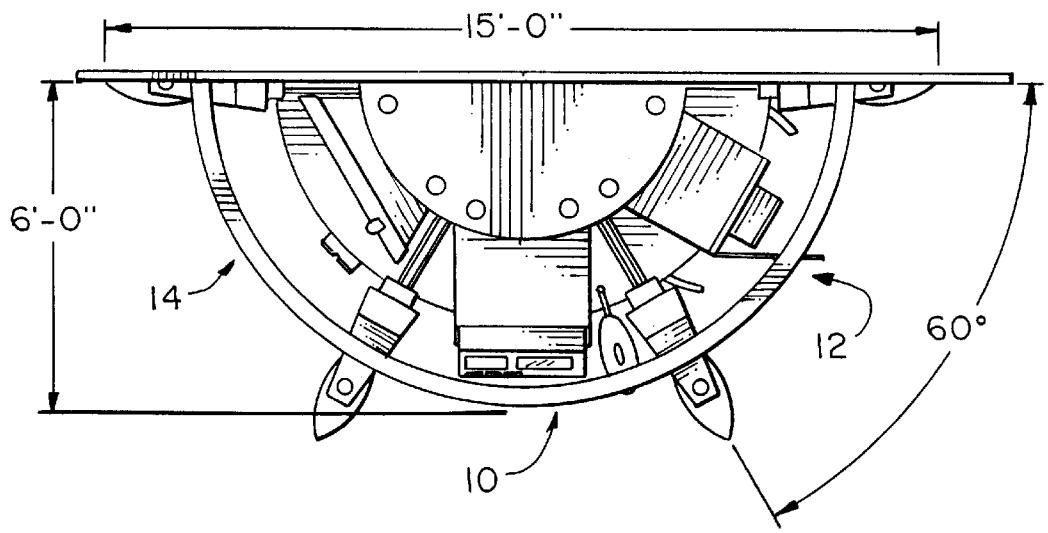
FIG. 3 is an elevation view of a commercial depository platform embodiment in accordance with the present invention.
Figures 1, 1B:
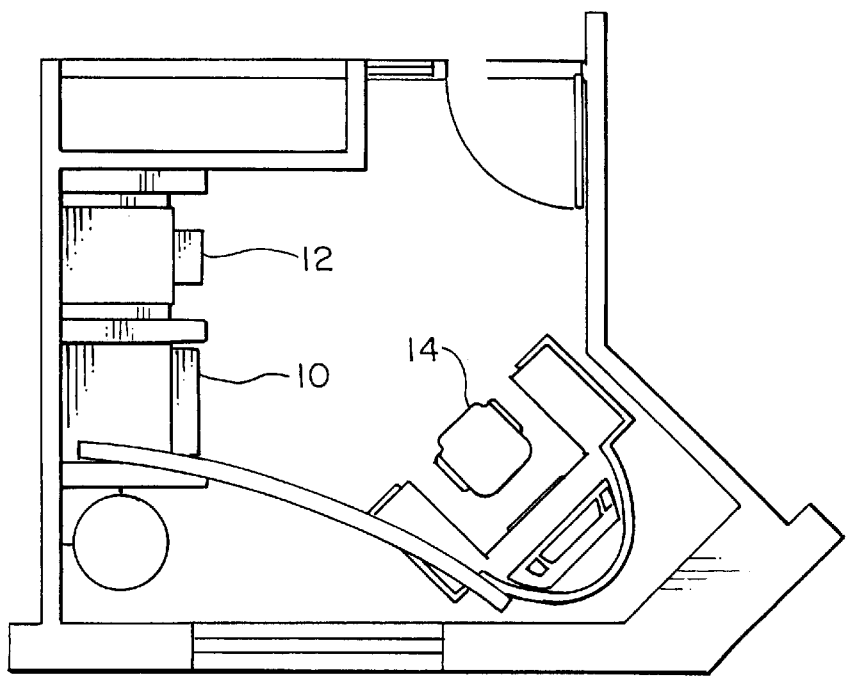
FIGS. 1B–1D represent a plan view of various arrangements and outline of the platforms tailored to fit within a space plan.
Figures 1, 1B, 2:
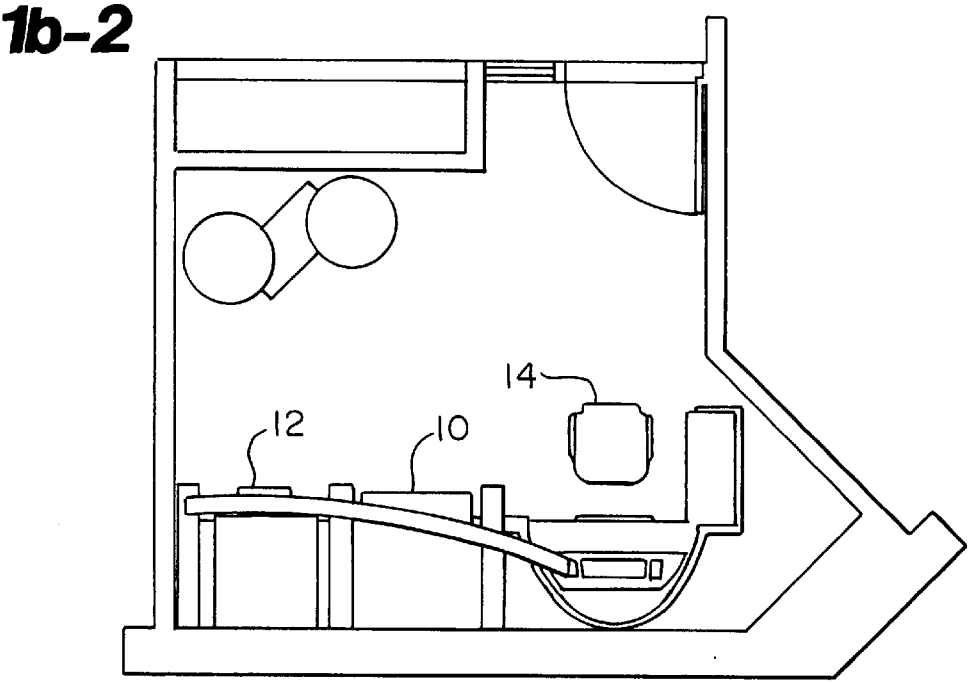
Figures 1, 1C:
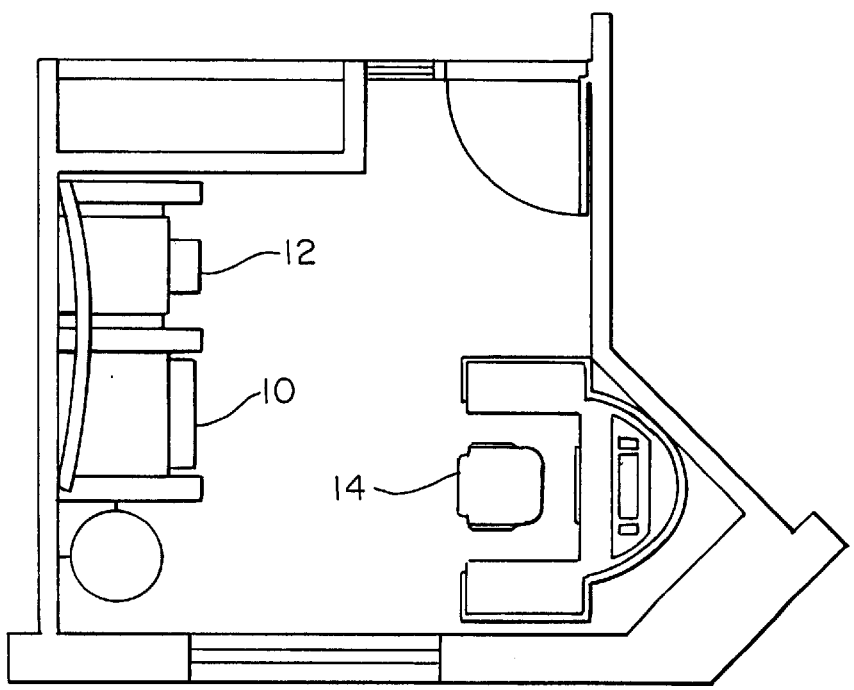
Figures 1, 1C, 2:
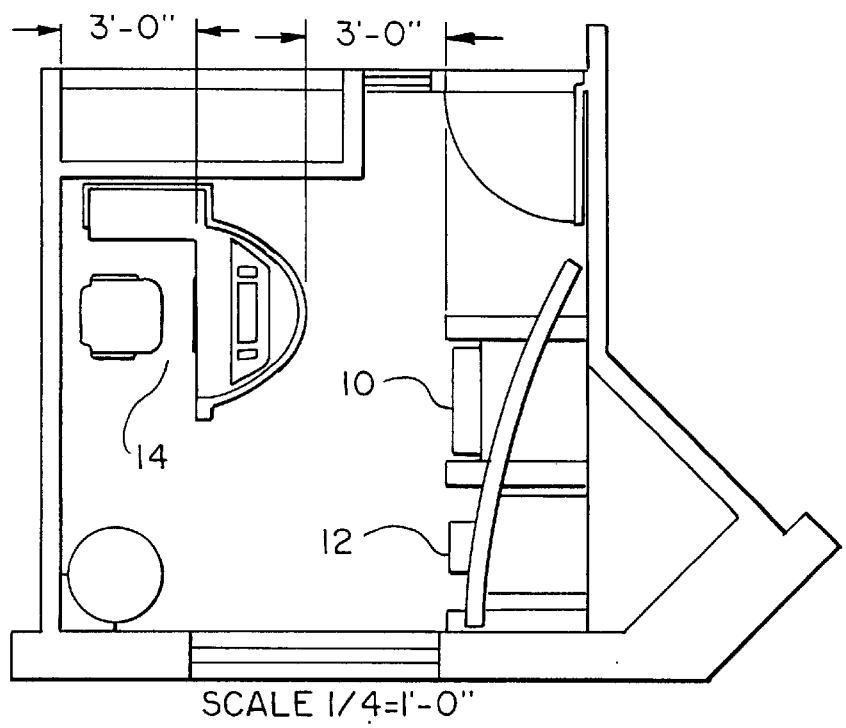
Figures 1, 1D:
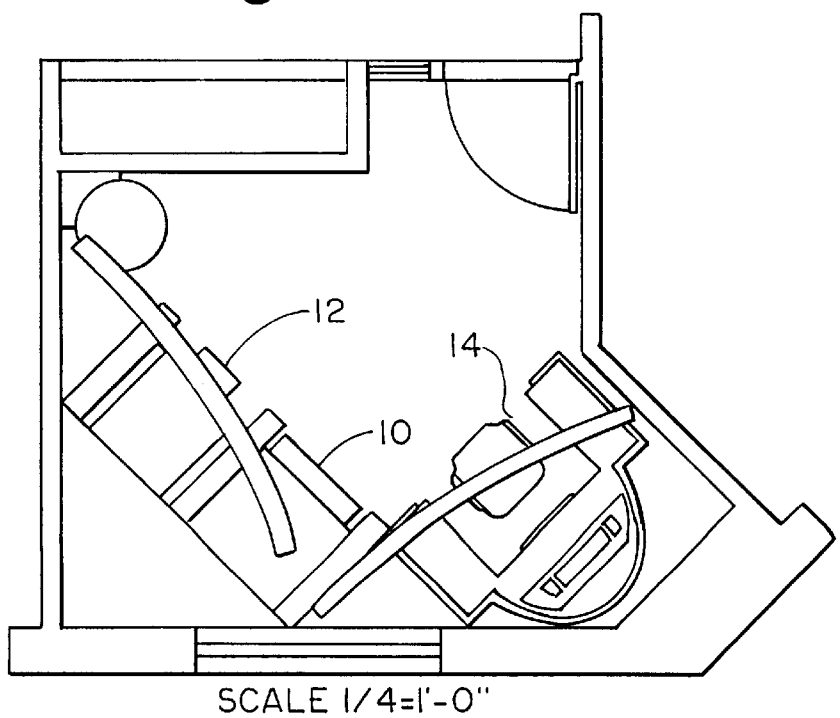
Figures 1, 1D, 2:
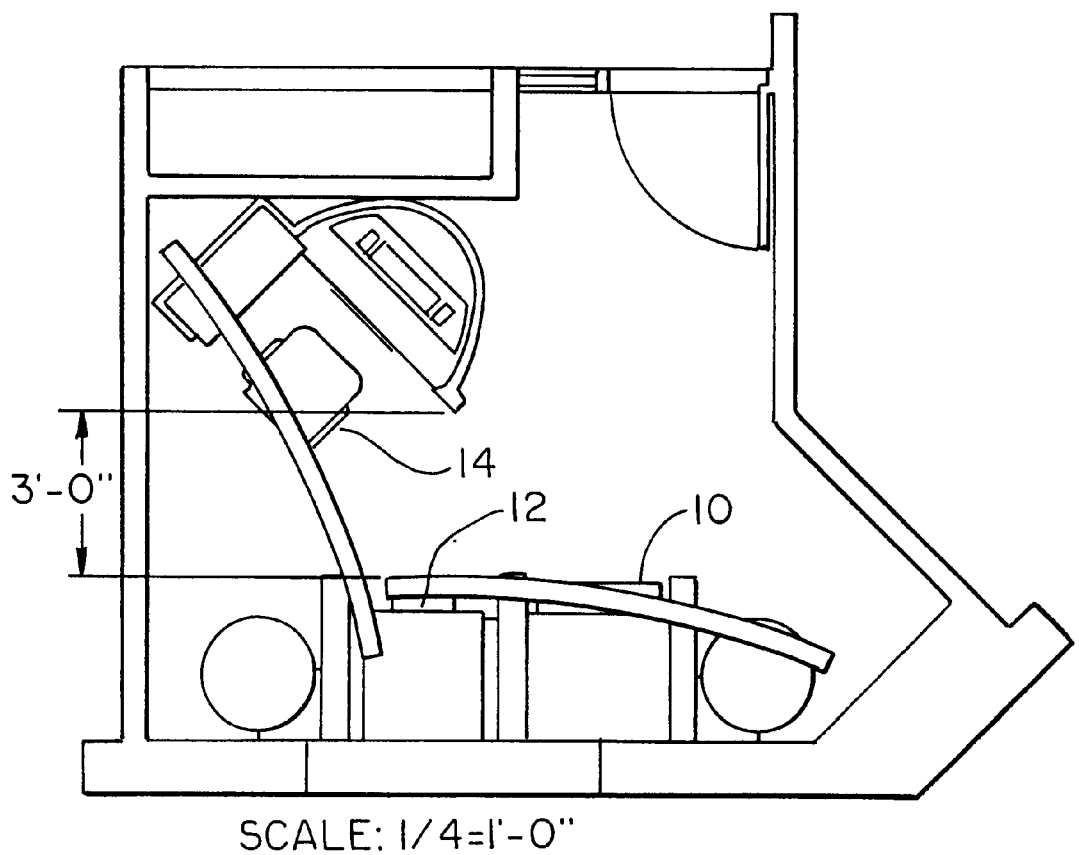
Figure 3:
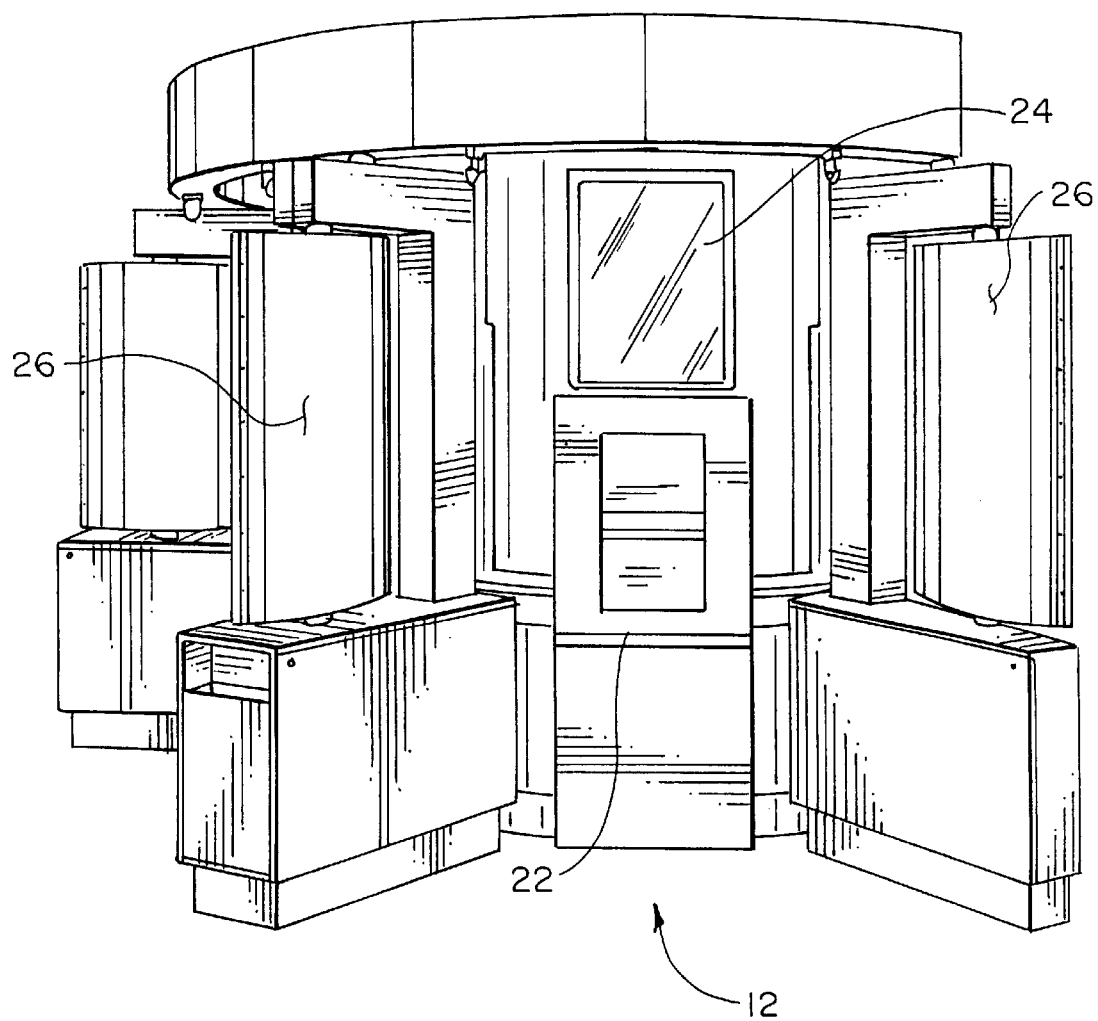

Referring next to FIG. 3, commercial deposit platform 12 is shown. The platform includes commercial depository box 22 with supplies. Screen 24 carries messages similar to that of screen 18. In the alternate, screen 24 provides menu-driven commercial deposit and related instructions including access to deposit accounts, balance and status reports. Side panels 26 provide space for deposit related advertisement and announcement and possible expansion space for additional screens.

Figure 4:
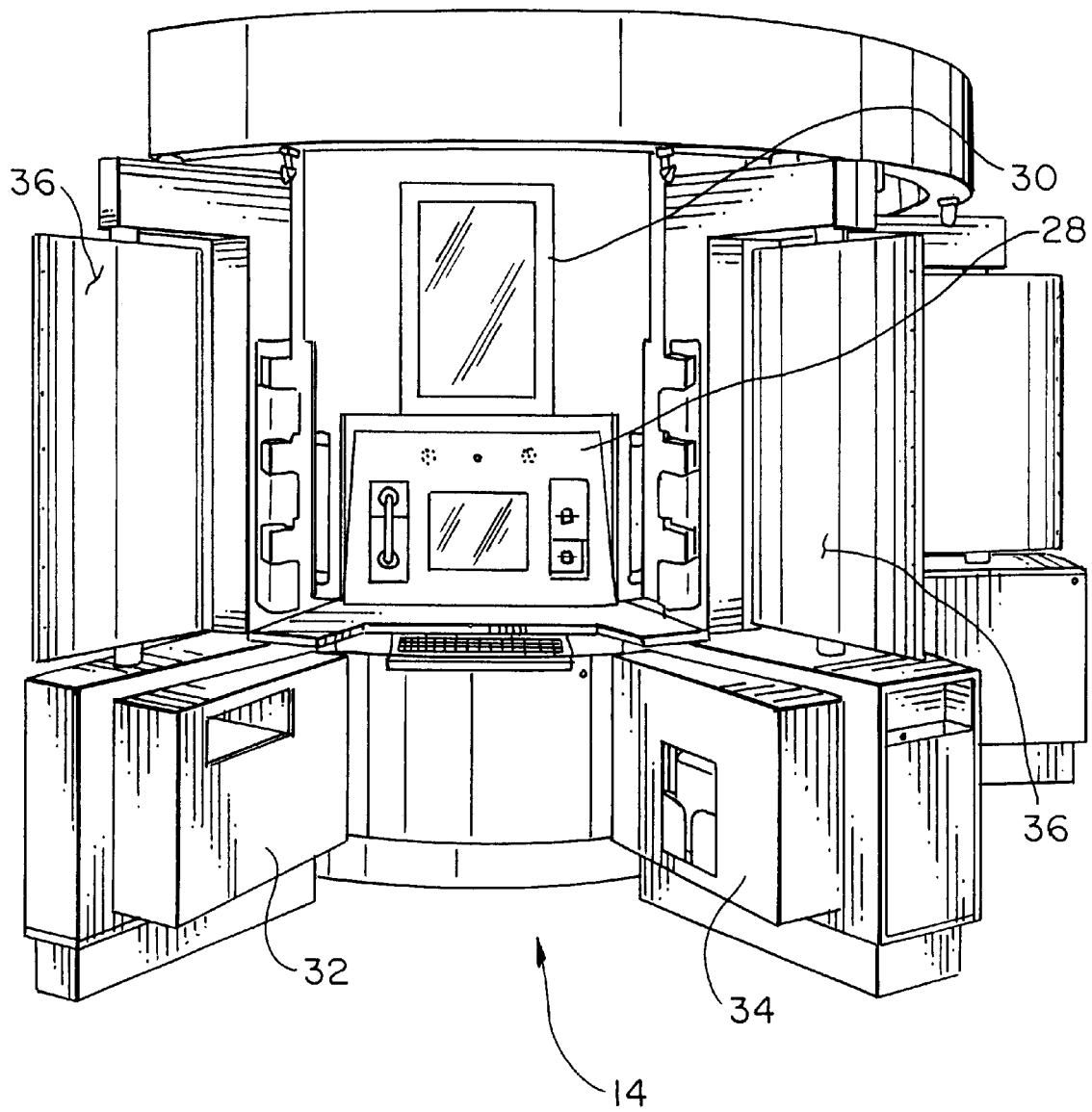
FIG. 4 is an elevation view of a videoconferencing platform embodiment in accordance with the present invention.

An elevation view of videoconferencing platform 14 is depicted in FIG. 4. The platform includes sound and image reception/transmittal portal 28. Portal 28 preferably includes a monitor, a phone, a keyboard, printer, scanner and image processor. The platform also preferably includes monitor 30 which is similar to screens 18 and 24. The system preferably utilizes an ISDN communications system or equivalent to send image and data from the customer station to the bank. Location 32 is structured to house a scanner and a printer for use by the customer to send/receive documents. As will be discussed hereinbelow, the scanner and printer at videoconferencing platform 14 enable document exchange and transfer between the customer station and the bank representative. Further document and paper storage and catch basket 34 is implemented to store paper, application forms and related documents for use by the customer. Side panels 36 provide space for advertisements, announcements and the like.

Videoconferencing platform 14 is one of the many innovative features of the present invention. The customer is enabled, inter alia, to interact with a bank representative face-to-face on a real time basis. Like all the other platforms, videoconferencing platform 14 includes a software system designed to provide information and functionality as if the customer were engaged in a face-to-face interaction with the remote bank representative. As is disclosed hereinbelow, the software program logic is robust and user friendly and provides the customer with various options to access and choose among various bank services. Platform 14 also includes interactive tools such as loan and deposit calculators, for example.

Directing attention to FIG. 5, a remote representative station 40 is shown. It is centrally located in the bank such as assignees headquarters in Minneapolis. Station 40 preferably includes a monitor 42 and keyboard 44 connected to a local area network (LAN) system. Station 40 further includes video screen 46 and voice and image processor 48. Alert system 50 is preferably integrated with video screen 46. Alert system 50 is preferably a probe light, radio signal or equivalent and is implemented to alert the bank representative of the presence of a customer at platform 14 requesting a videoconferencing session.

FIG. 6 depicts one embodiment of the underlying computer system of the present invention. Computer 60 includes memory and implemented software to operate the various data transfer and transactional processes between the customer station or stations and the bank. Computer 60 may preferably include a plurality of servers forming a LAN network. Computer 60 is in operative electronic connection with display 62 and mouse 64. The software in the present invention is initiated by a menu driven command means and the user/programmer is enabled to interact with the software via keyboard 66 at the display 62 and mouse 66.

The embodiment of FIG. 7A depicts a high level logic flow chart relating to customized ATM 16. The program is initiated at logic step 70. Subsequently the program proceeds to logic step 72 where a menu is displayed. The menu may request the customer to enter such data as may be deemed necessary to identify the customer. The program advances to decision step 74 where it is confirmed that all the necessary disclosure has been made or entered. In the event the customer fails to comply with the menu requirements, the program reverts back to pre logic step 72 where after a predetermined number of trials a "please contact your personal banker" message may be posted. If all the required information is entered, the program logic proceeds to logic step 76 and displays a set of menus from which the customer is asked to choose. One of the menu displays includes logic step 78 where a cash withdrawal with a receipt option is displayed. Similarly various other options such as balance inquiry 80, fund transfer 82, financial profile 84, ticket or stamp dispensing 86 and control of commercial depository box 22 and other features 88 are displayed. The customer may choose one of these options. When the choice is made, the program logic proceeds to logic step 90 where the relevant data in the file may be accessed. Thereafter, the customer is guided by sub-menus to execute the necessary and proper transactional command under logic step 92 where the new transaction is updated and saved in the file of computer 60 and the session is terminated at logic step 100.

Figure 7B:
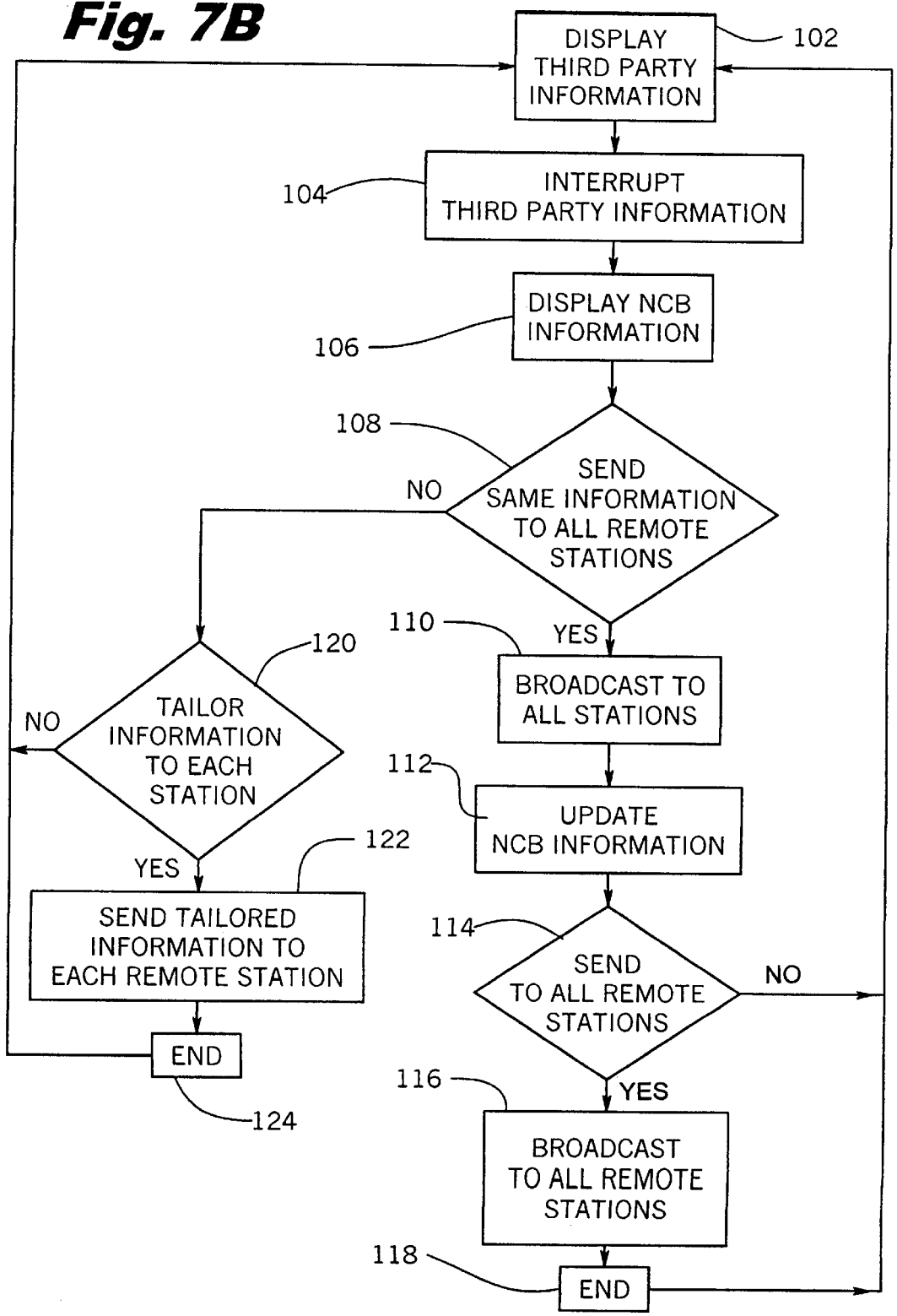

Directing attention to the embodiment of FIG. 7B, the flow chart for the high level software program to manage the information displayed on screen 18 is shown. The program logic is active starting at logic step 102 where a 3rd party information such as stocks, time and temperature, news highlights and breaking news may be displayed. Third party information is generally complementary and NCB may attach a disclaimer or limited liability on financial information originating from such third parties. Under subsequent logic step 104 the program may over ride or suppress the display under logic step 102 to promote the bank's own information as shown under logic step 106. For example in this step, the assignee of the present invention, National City Bank (NCB), may display/broadcast NCB rates, product specials, service and seminars to customers at various remote locations. When, NCB utilizes this feature, the program logic proceeds to decision step 108 where the program logic confirms whether to send/broadcast the same message or tailor messages to be sent to different customer locations. If the decision is to broadcast the same message to all customer locations, the program logic proceeds to logic step 110 and the message is sent to all the locations. The information may also be updated under logic step 112. The program logic advances to decision step 114 to check if the updated message should be sent to all customer locations. If the decision is to simultaneously broadcast the message to all remote centers the program logic proceeds to do so under logic step 116 and the session terminates under logic step 118 from where it may revert back to logic step 102. In the alternate, if under logic step 108 the decision is not to broadcast to all customer stations, the program logic proceeds to decision block 120 where it would be decided whether to tailor the information to each and /or a group of customer stations. If such decision is not made, the program reverts back to logic step 102. If however, it is directed to tailor the information, the program logic advances to logic step 122 where the tailored information is broadcast to the specified customer stations. The session ends under logic step 124 and the program logic may then revert back to logic step 102. Similarly if under decision step 114 the updated information is not to be sent to all customer stations the program reverts back to logic step 102 and will resume to display the third party information.

Figure 8A:
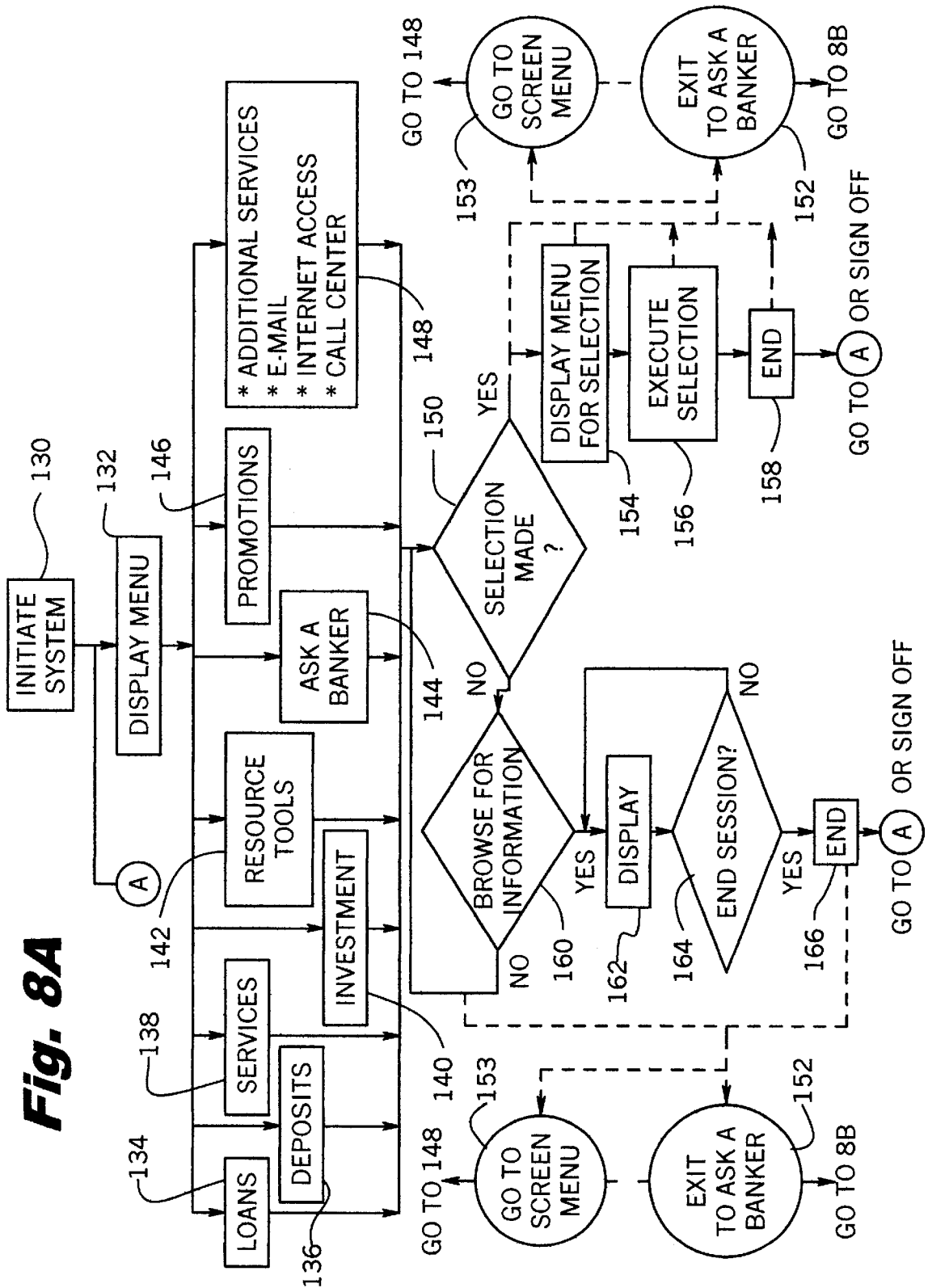
Figures 1, 9A:
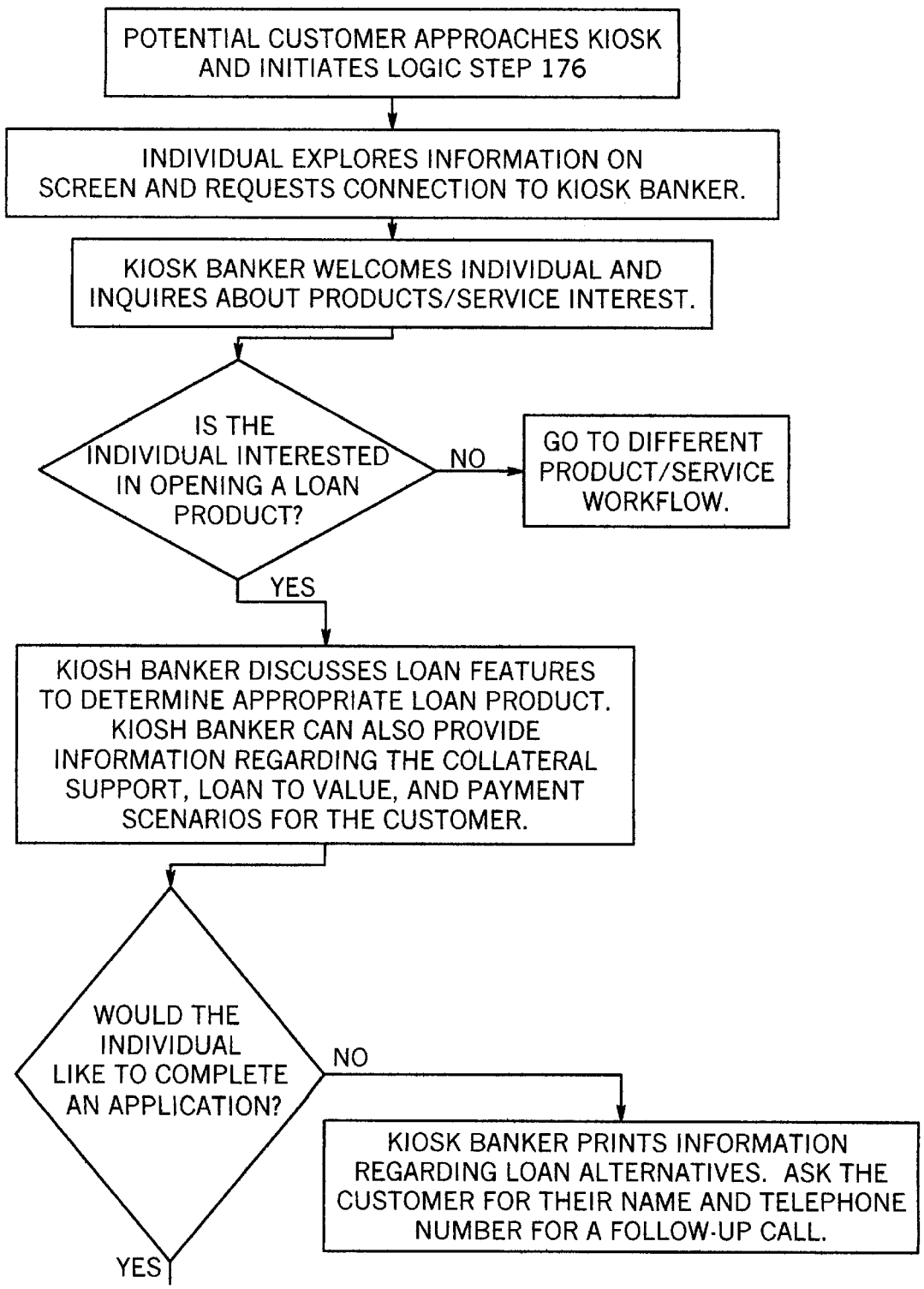
Figures 2, 9A:
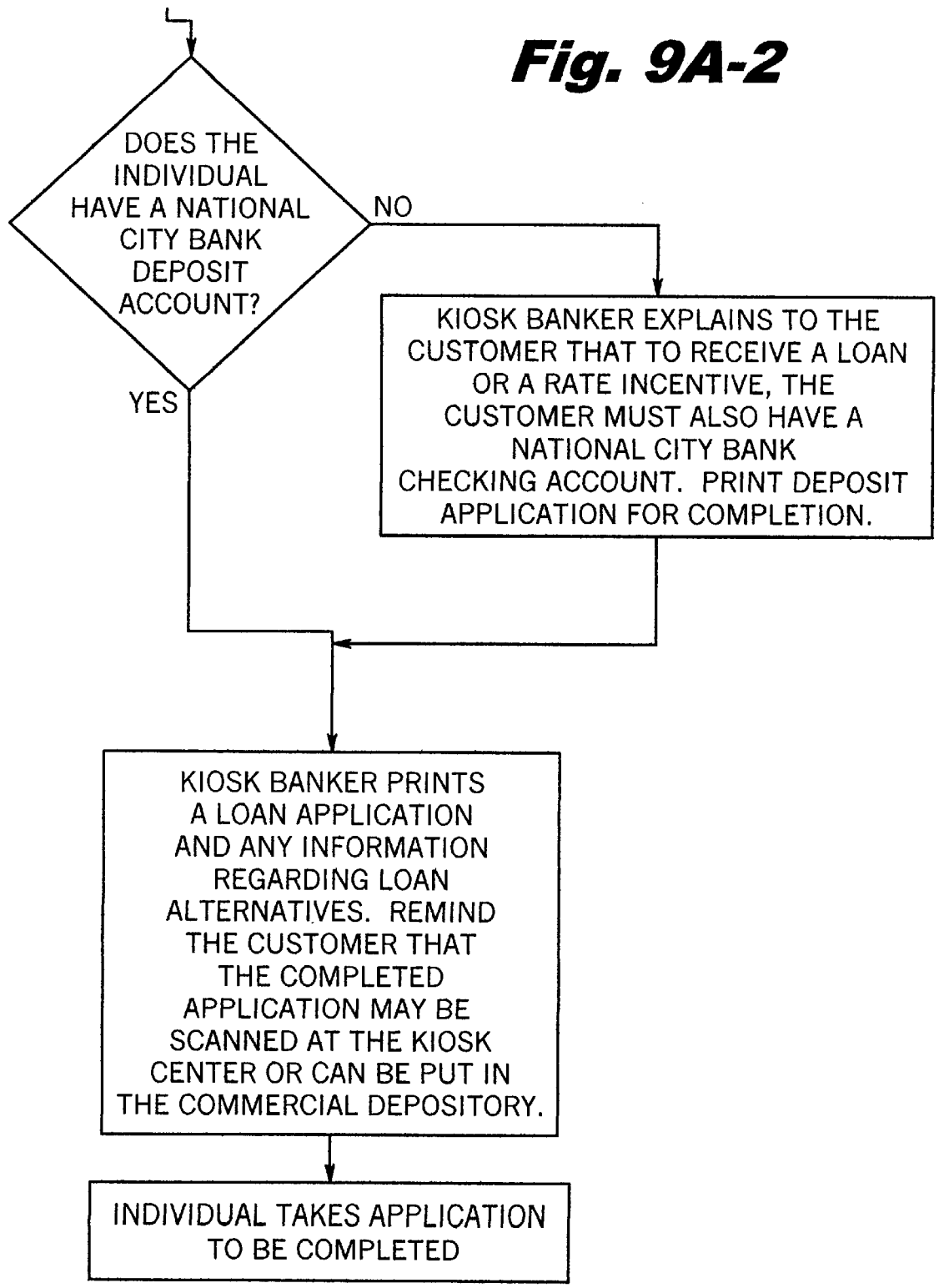
Figure 9B:
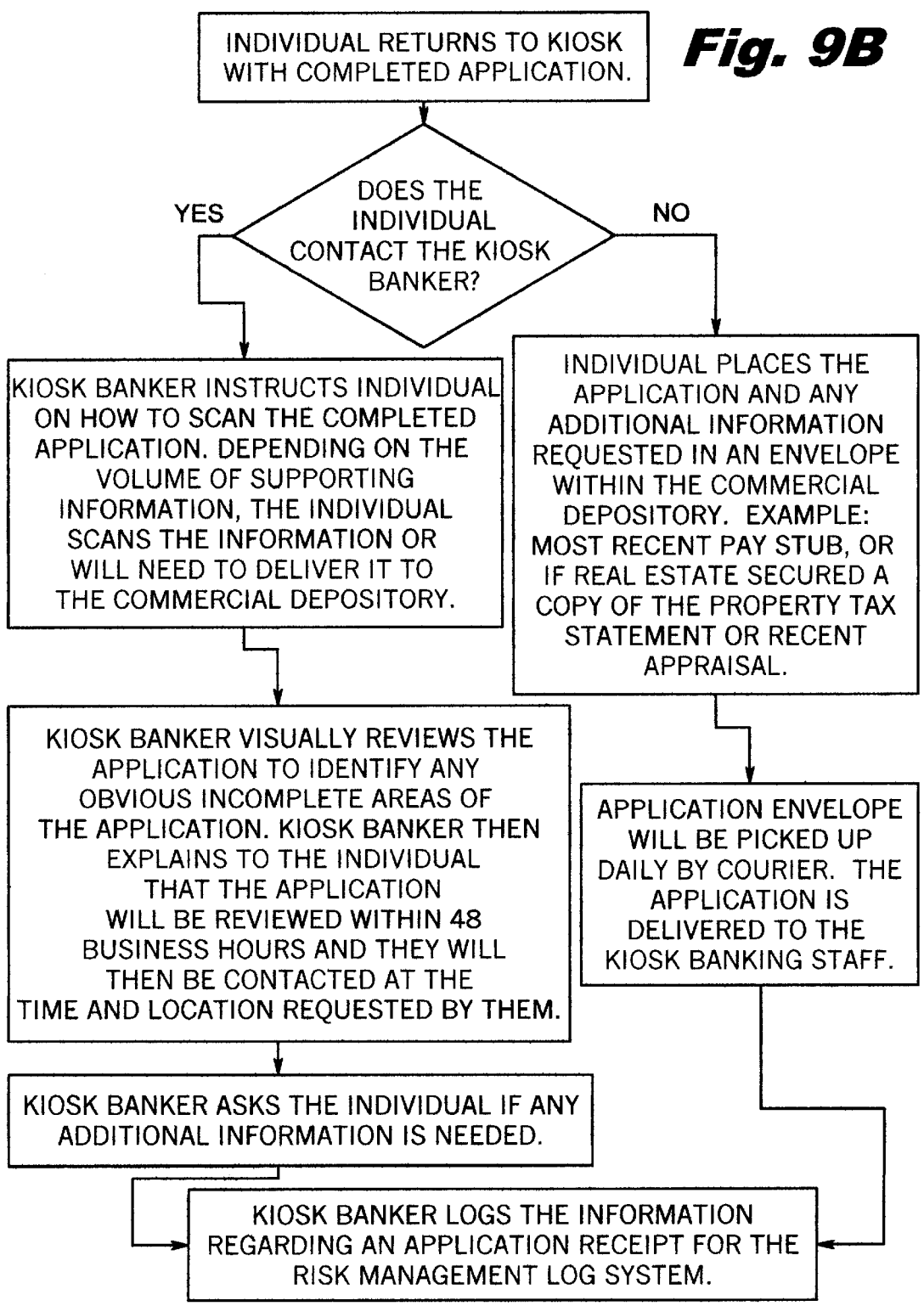
Figure 9C:
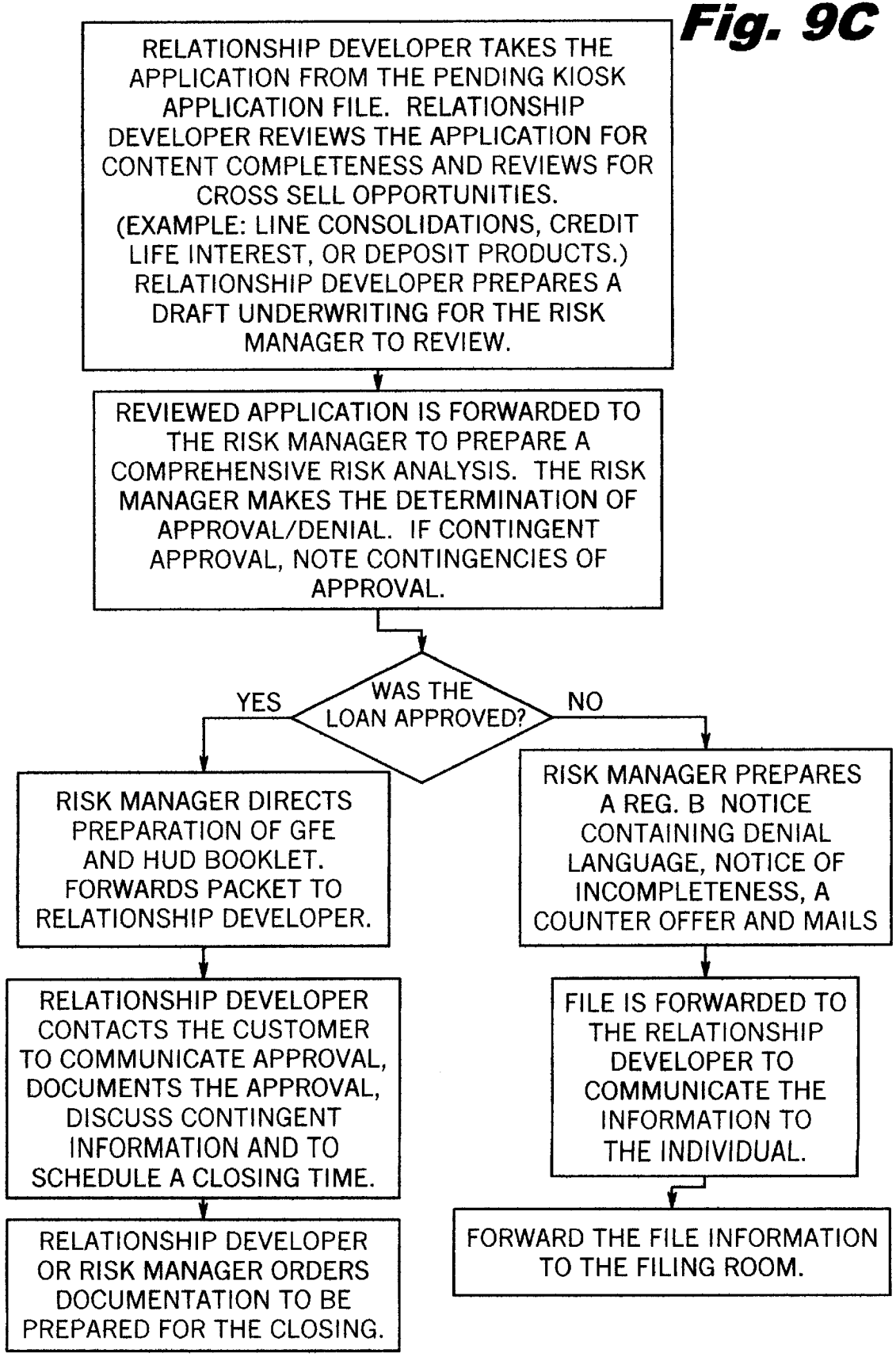
Figures 1, 9D:
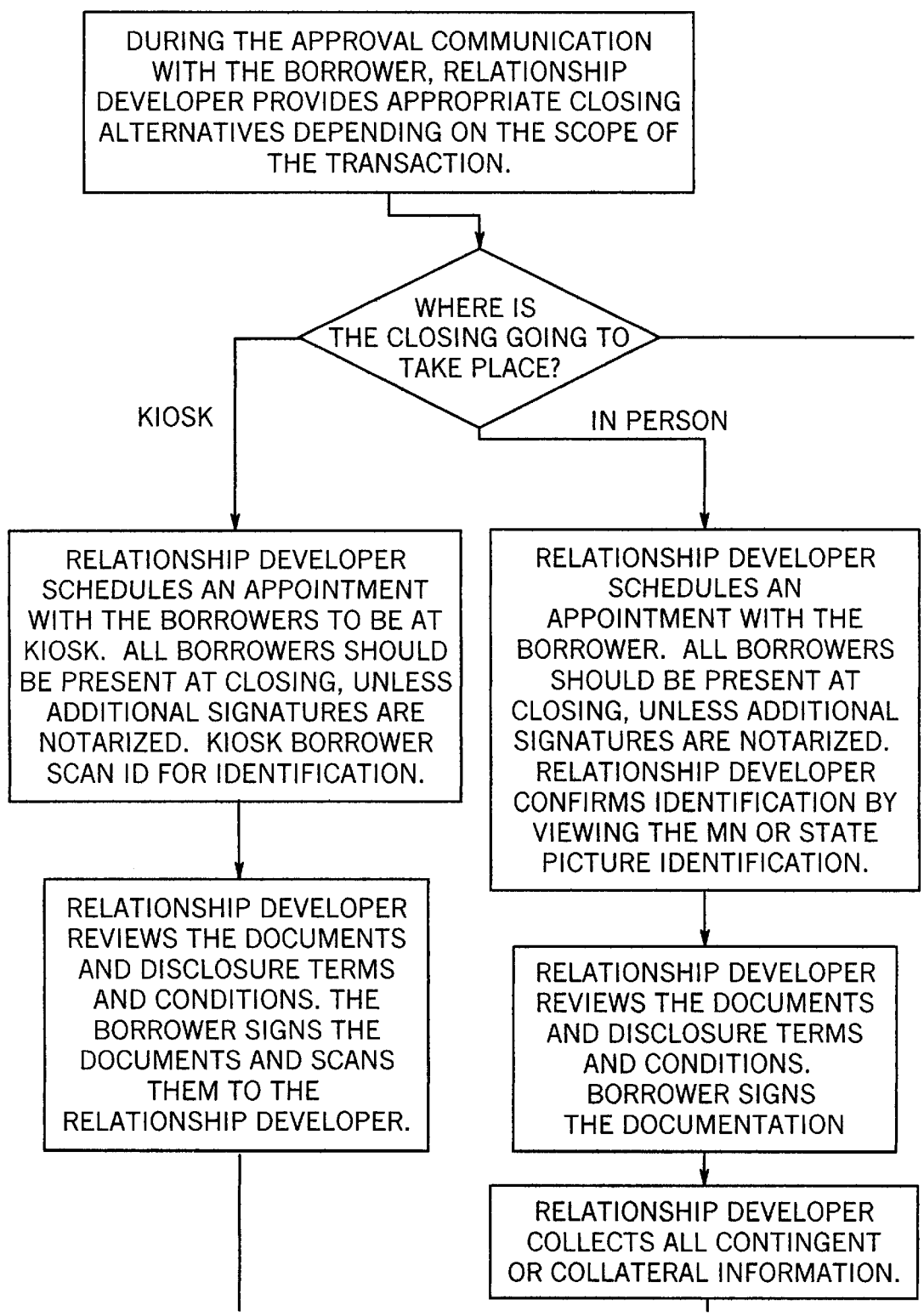
Figures 2, 9D:
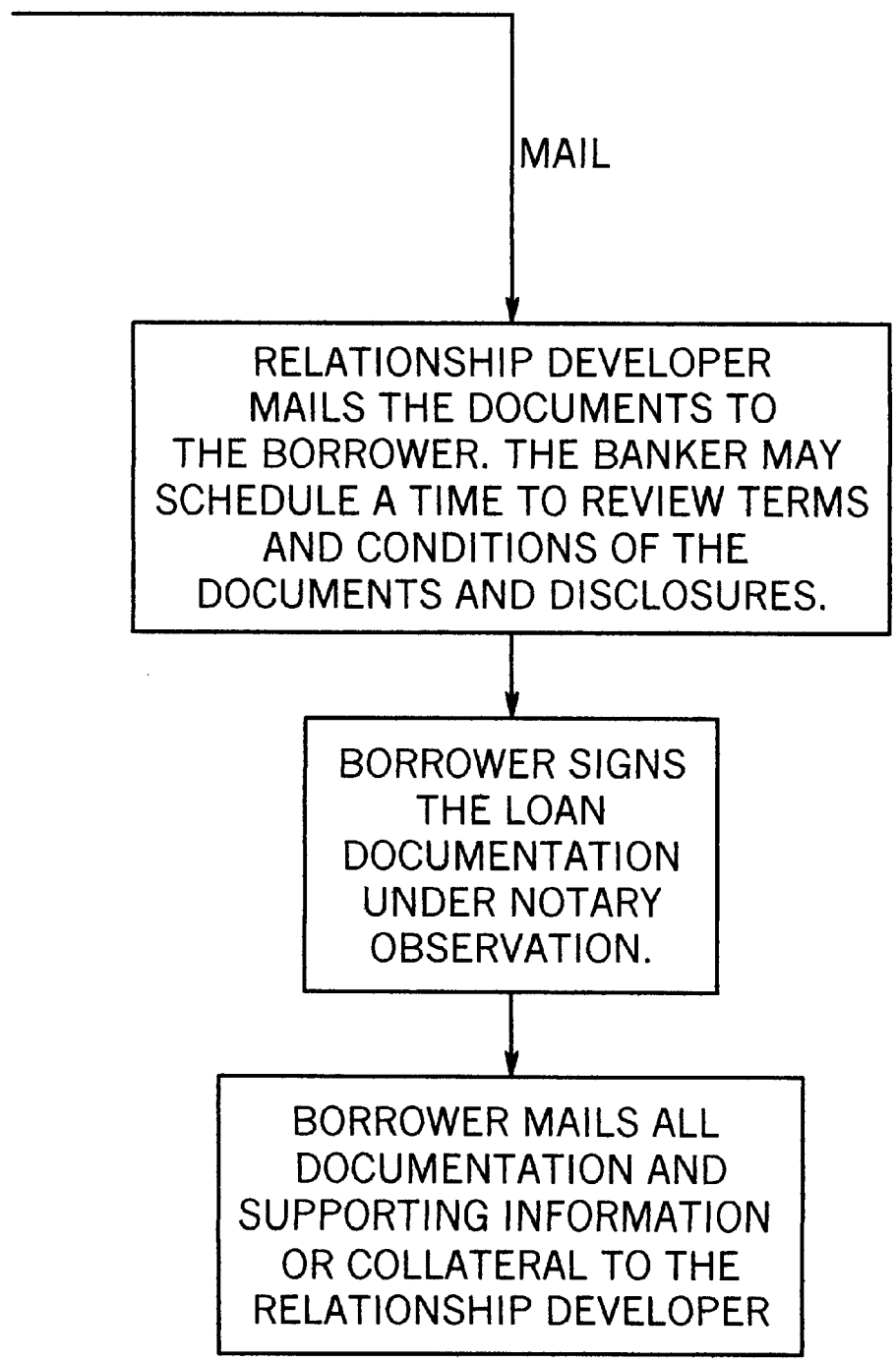
Figure 9A:
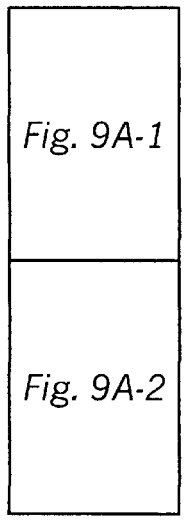
Figure 9D:
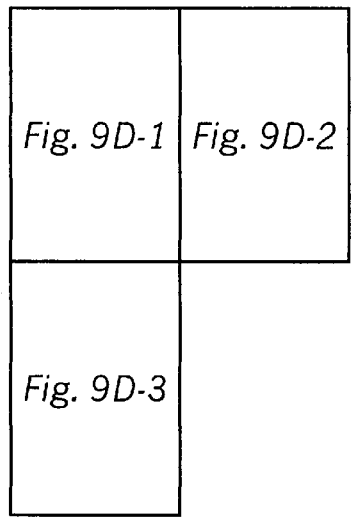
Figures 3, 9D:
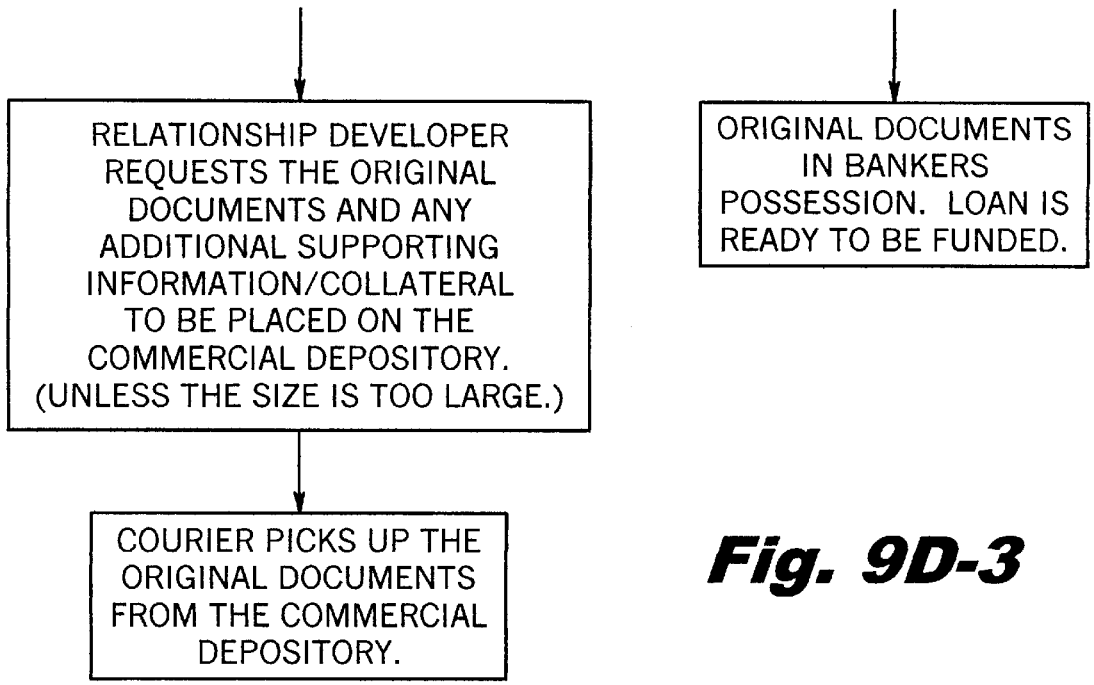

Referring to the embodiment of FIG. 8A, a high level software logic flowchart of the videoconferencing platform 14 is shown. Videoconferencing platform 14 is a customer connection engine and brings financial service to as near to a person-to-person banking as possible regardless of the location of the customer. The videoconferencing software logic is remotely initiated by the client under logic step 130. The screen at portal 28 displays a set of menus under logic step 132. The menus, inter alia, are displayable under different headings to direct the customer to various sub menus and transactions. Accordingly, menu step 134 displays and relates to loans, menu step 136 relates to deposits and menu step 138 relates to services. Similarly, investment options and instructions are given under menu step 140, resource tools under menu step 142, face-to-face interview with a banker is triggered under menu step 144 and promotional information and literature is reviewed under menu step 146. Further, additional services, e-mail, internet access and call center connections may be accessed under menu step 148. These menus may be displayable on a split screen segregating, for example, bank transactions from investment options and related information.

As described hereinabove, menu step 148 includes menus such as E-mail, internet and intranet connections tailored to enable the customer to access personal financial data directly and conduct various financial transactions as needed. More specifically, menu step 148 is implemented to provide functional options, inter alia, to enable the remote banker to open commercial depository box at remote commercial depository platform 12 and allow the customer to deposit documents. Menu step 148 may also be used to implement additional options thus making the system of the present invention highly flexible to host additional features.

After a menu is selected for execution, the program logic proceeds to decision step 150 where it is ascertained if a selection is made by the customer. If a selection is found to be made the program logic proceeds to logic step 154 where a sub-menu is displayed for the selection. It should be noted that the program logic allows the user to exit a "current" or "subsequent" logic step at any time to contact a "live person" or a banker under the over-ride logic step 152. Assuming the customer does not want to interact in-person with a banker, the program logic proceeds to logic step 156 and executes the selection. Ultimately, the program is terminated under logic step 158 and either reverts back to a static subroutine status just before logic step 132 or invites the customer to exit and ask a banker under logic step 152, go to split screen menu under logic step 148 or sign off. In the event no selection is made under decision step 150, the program logic proceeds to decision step 160 where the customer is invited to browse for information. If the customer chooses to browse, the program logic proceeds to logic step 164 and a set of menus is displayed. The program logic invites the customer to exit the browse function at any time under decision step 164. When the customer elects to exit, the program logic proceeds to logic step 166 where it reverts back to logic step 132 and enters a static subroutine. In the alternate, the customer is invited to either exit and ask a banker under logic step 152, go to split screen menu under logic step 148 or sign off.

The embodiment of FIG. 8B shows a high level logic flow of the software for a face-to-face interview with a remote banker. Specifically when the customer elects to interrupt any logic step in the program of FIG. 8A and exits to ask a banker under override logic step 152, ask a banker logic step 170 is concurrently initiated. The system proceeds to logic step 172 where an indicator/alarm is activated under logic step 172. As discussed hereinabove, the alarm is to alert the remote banker of the presence of a client requesting a person-to-person interview. The program logic proceeds to decision block 173 to check if a banker is available. If a banker does not respond within a preset time interval, the logic advances to logic step 175 where a message including instructional menus are displayed at the customer station, platform 14. The message menu may include a questionnaire for the customer to leave personal information for later contact by a bank representative. It may also include invitation to access intranet data for instructions to process specific transactions. The menu may also provide a button to access other services under logic step 148. Subsequently the program logic proceeds to logic step 174 to begin videoconferencing. The program advances to the next stage of displaying menus for loan account under logic/menu step 176, checking account under menu step 178 and other questions and transactions under menu step 180. If the remote customer elects a loan account under logic step 176 the program proceeds to logic step 182 to follow the loan account procedure. Similarly, choices under logic step 178 and 180 proceed to checking account procedure under logic step 184 and bank guidelines under logic step 186, respectively. The face-to face interview with the remote banker is terminated under logic step 188.

The embodiment of FIGS. 9A–9D depict the assignee's preferred procedure to process a new loan account under logic step 176. The procedure enables the customer to complete all transactions via videoconferencing. Specifically, when the customer decides to have a face-to-face interview with a bank representative, the customer approaches videoconferencing platform 14 and initiates ask a banker menu under logic step 170. Subsequently the remote bank representative is alerted and the videoconference is started under logic step 174. Assuming that the customer wants to initiate a loan account under logic step 176, the loan account procedure of FIGS. 9A–9D will be followed under logic step 182. Accordingly, the bank representative ascertains if the customer is interested in opening a loan product; if not the customer is directed to the relevant product/service. When the loan account option is elected, the representative will discuss loan features to determine the appropriate loan product. The bank representative can also provide information regarding collateral support, loan to value and payment scenarios for the customer. Thereafter, the bank representative may ask if the customer is interested in completing an application. If the customer declines, the bank representative will print information regarding loan alternatives and the customer will get the printout at the remote videoconferencing platform 14. The representative may request for the customer's name and telephone number for follow-up purposes. The customer may communicate the required personal data in person or may enter the data using a split screen data entry menu preferably using menu step 148. In the alternate if the customer decides to complete an application, the bank representative would ask if the customer has a National City Bank deposit account. The representative would explain that to receive a loan or a rate incentive, the customer must also have a National City Bank checking account and if the customer has no such account a deposit application will be printed at platform 14 for th e customer to complete and scan back to the bank representative.

Yet another alternate procedure would be for the customer to access an application menu via a split screen, under menu step 148, and electronically transfer the application/documents to the representative at the bank. This is typically done by providing a set of menus on a split screen and may also be used when the bank representative is not available to attend to the customer's application at platform 14.

The application may be submitted by the customer using the scanner provided at platform 14. In certain cases, the customer may need to deposit the application in commercial depository 12. The representative will remotely open box 22 for the customer to deposit the documents. As discussed hereinabove, the customer may also enter the required information on the split screen in accordance with the menu and guide provided under menu step 148. If the customer returns to platform 14 with a completed application, the bank representative will provide instructions on how to scan the completed application. If the supporting information is voluminous, the customer may need to deposit it in box 22 and the banker will remotely open box 22 to allow the customer to deposit the documents in commercial depository 12.

Generally, when an application is scanned and submitted to the banker via the scanner, the banker reviews the application and informs the customer that the application will be reviewed within a short time, preferably not more than 48 hours, and the customer will be contacted by NBC. Subsequently, the banker may ask the customer if there are any other additional information needed and logs in the information regarding the receipt of the application for risk management log system and the session is terminated. In the event the customer is unable to establish contact with the banker, the application may be deposited in one of the drop off boxes of commercial depository 12. The application is then forwarded to the banker to be entered in the risk management log system. Thereafter, the application goes through a review and underwriting process. Generally this involves a review of the application for content and completeness. The reviewed application is forwarded to the risk manager. If the loan is approved, the risk manager forwards the packet to the relationship developer who will contact the customer to inform the approval and to schedule a closing time. Thereafter, the final documents will be prepared for the closing. If the loan is not approved, the risk manager prepares a denial notice and the relationship developer will communicate the information to the customer.

During the approval communication with the borrower, the relationship developer may suggest closing alternatives depending upon the scope of the transaction. The closing may be conducted in person, by mail or via videoconferencing. If videoconferencing is selected, all the borrowers are requested to be at the remote station on a specified time and date. The identification of the borrowers including other required documents are scanned and submitted to the banker. The banker reviews the documents and instructs the borrower to sign the documents and scan them to bank station 40. The banker will then instruct the borrower to deposit the original in commercial depository 12 which will be picked up by a courier in due time. When the original copies of the signed documents are secured, the loan funding process is initiated and the information is communicated to the borrower (see FIG. 9E).

Figure 10:
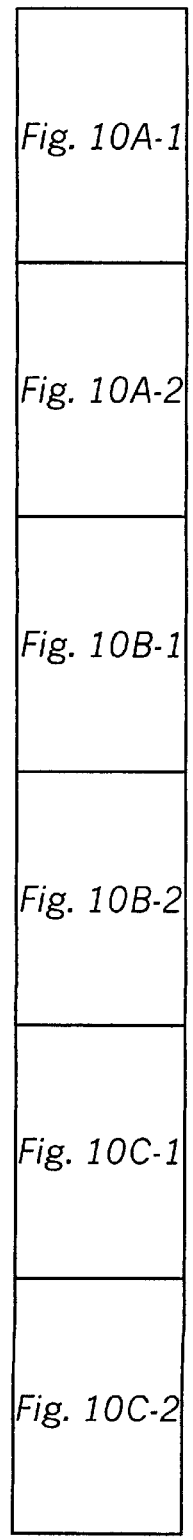
FIGS. 10A, 10B and 10C represent new checking account work flow process in accordance with the present invention.
Figures 1, 10A:
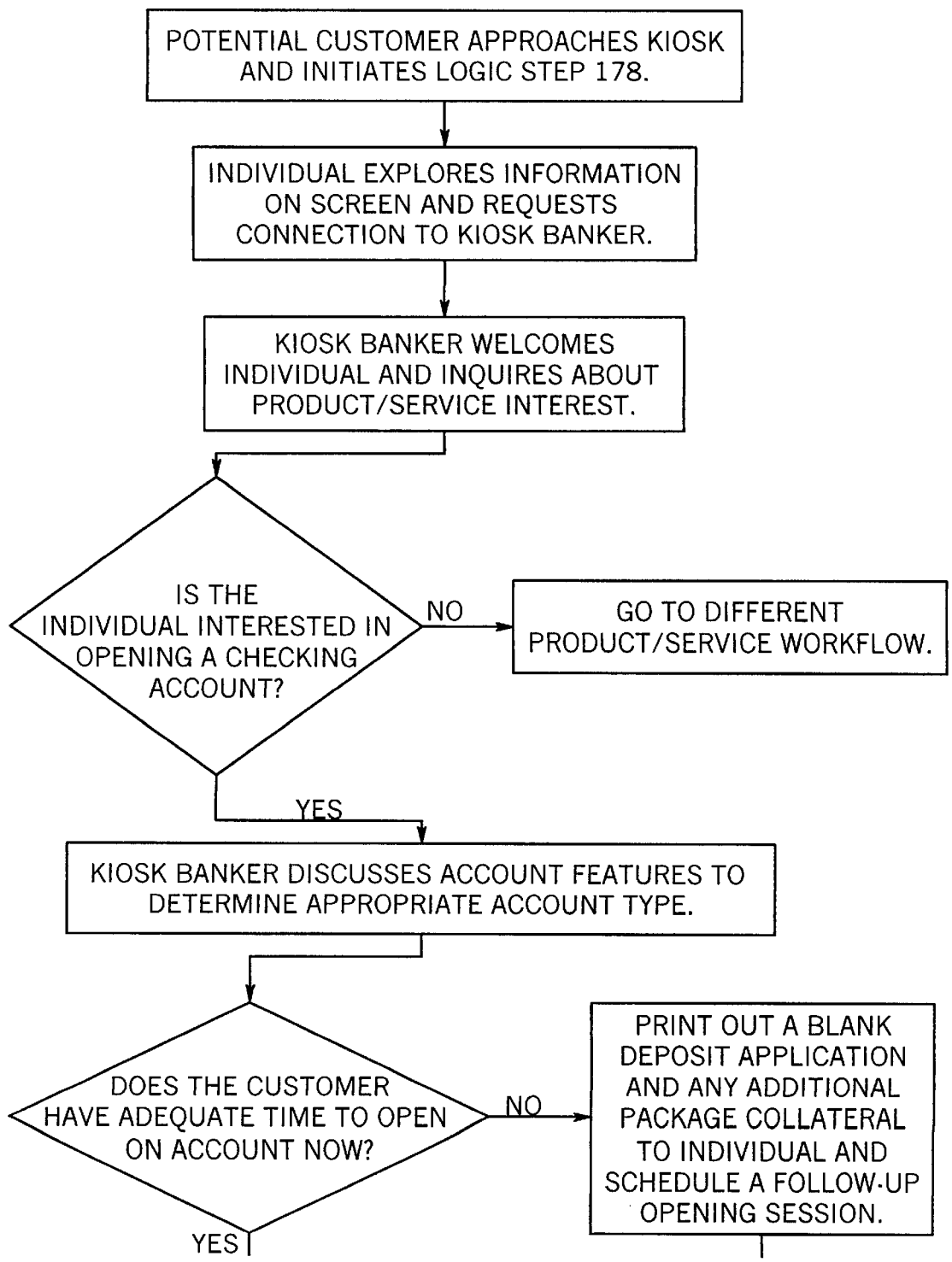
Figures 2, 10A:
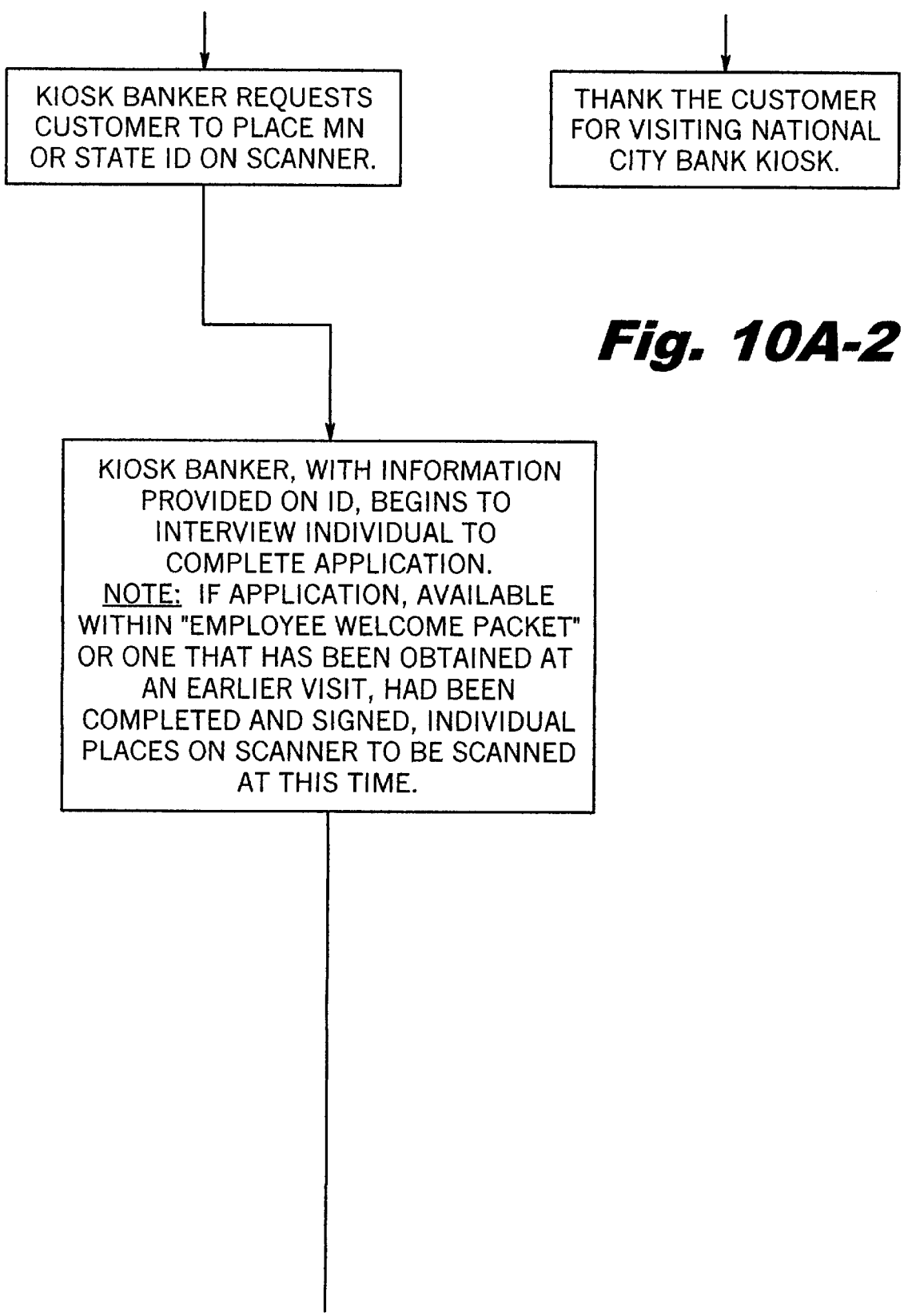
Figures 1, 10B:
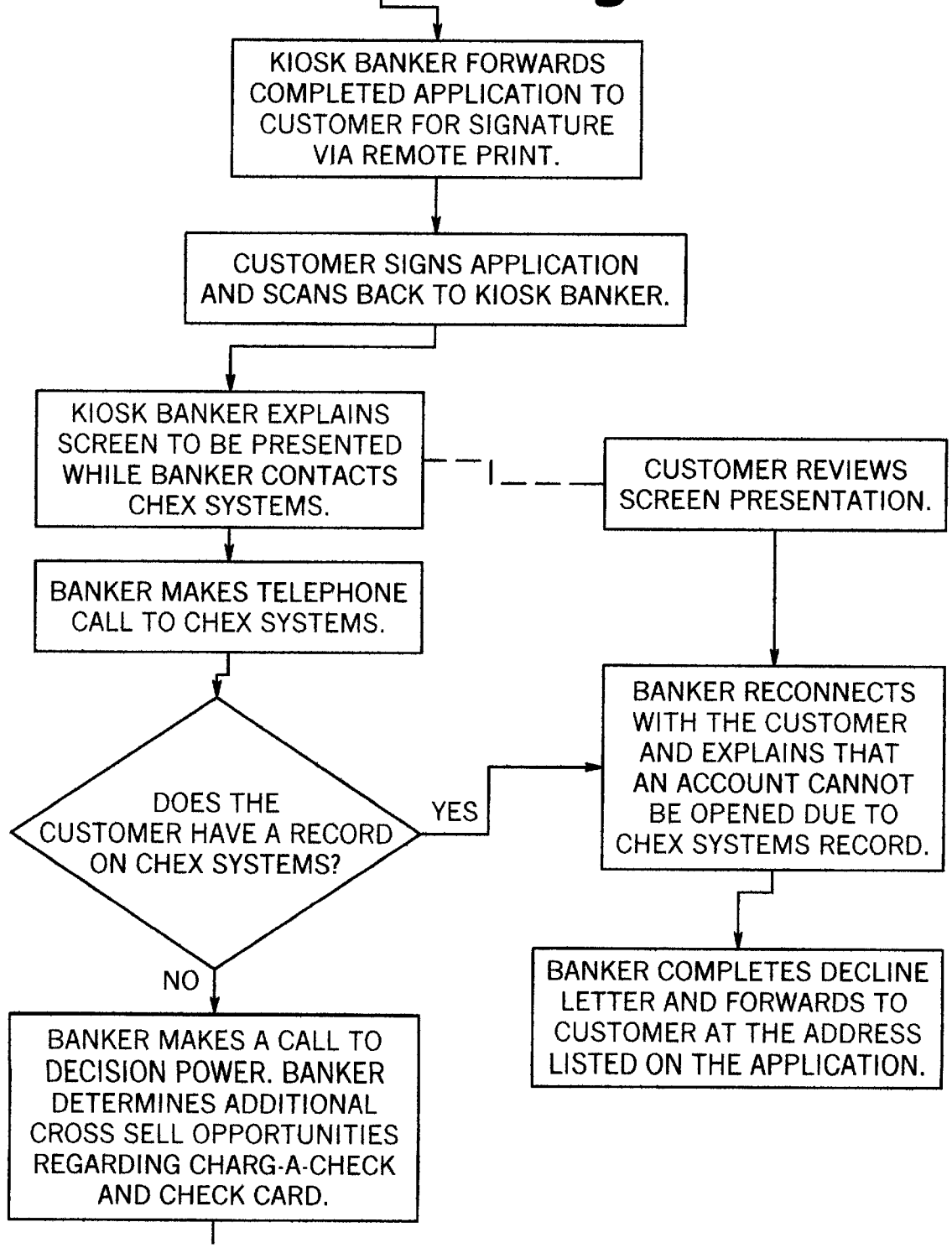
Figures 2, 10C:
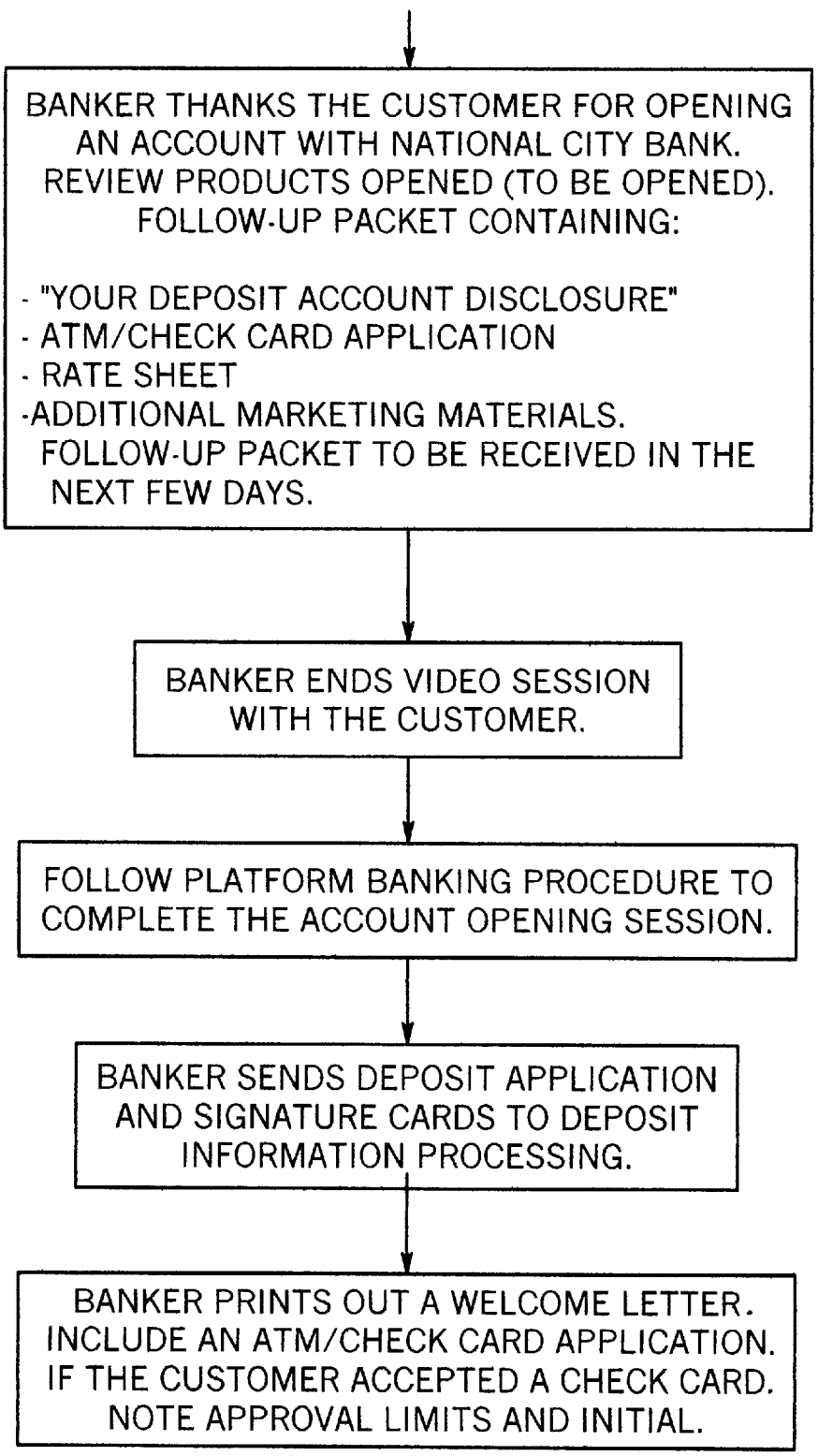

The embodiment of FIGS. 10A–10C depict the assignee's preferred procedure to process the opening of a new checking account under logic step 178. The procedure enables the customer to complete all transactions via videoconferencing. Specifically, when the customer decides to have a face-to-face interview with a remote bank representative, the customer approaches videoconferencing platform 14 and initiates an ask a banker menu under logic step 170. Subsequently the remote bank representative is alerted and the videoconference is started under logic step 178. Assuming that the customer wants to initiate a checking account under logic step 178, the new checking account procedure of FIGS. 10A–10C will be followed under logic step 184. Accordingly, the bank representative ascertains if the customer is interested in opening a checking account and if not the customer is directed to the relevant product/service. When the new checking account opening option is elected, the bank representative discusses account features to determine the appropriate account type. Additionally, the representative checks to see if the customer has adequate time to open an account contemporaneously. If not, a blank deposit application and additional package, as needed, is printed by the bank representative for collection by the customer at platform 14. The representative may also schedule a follow-up session for opening the new account.

In the alternate if the customer is ready to open a checking account, the bank representative will request the customer to place a personal identification on the scanner. Thereafter, the bank representative will interview the customer and proceeds to complete the application. Subsequently, when the application is completed, the bank representative forwards the application to the customer at platform 14. The customer signs the applications and scans it back to the bank representative. A screen presentation is displayed for the customer to review while the bank representative calls Chex Systems or equivalent. The representative checks to see if the customer has a record on Chex Systems. In the event a record is found, the representative reconnects with the customer and explains that an account could not be opened because of a Chex Systems record. Alternately, if the customer has no record on Chex Systems, the bank representative processes the application and informs the customer of other products such as, for example, charge-A-check, ATM or Check Card. Subsequently, the customer may select all or some of the products suggested and the bank representative prints out all the relevant documents to be received at platform 14.

Before the customer signs all the papers and submits them via the scanner, the bank representative ascertains whether the account is individual or joint. If the account is individual, the customer is required to sign the documents as needed and scan them back to the bank representative. The original documents are then placed in one of the boxes of commercial depository 12. If the documents need to be deposited in box 22, the bank representative can remotely open box 22. If the account is a joint account, the customer signs a temporary card and scans it back to the bank. The original documents need to be signed by an additional signer and upon completion are required that they be mailed to the bank or placed in night deposit 12. In either case, the bank representative discusses options of funding the account. Some of the funding options which may be discussed include ACH payroll, check deposited with original documents in box 22 or open with a zero (or premium) balance. Subsequently, the customer selects the preferred deposit method and also executes a check order selection. A check order selection may be accessed by initiating a type of checks menu displayable on a split screen under logic step 148.

Finally, the bank representative thanks the customer for banking with NCB and ends the session. Thereafter, the bank representative follows NBC's established procedures to complete the account opening process including the preparation and mailing of a welcome letter to the client.

Referring now to FIG. 11 a high level software logic flow chart for commercial depository 12 is shown. The program begins at logic step 70 where the customer initiates ATM 16. Subsequently, the program proceeds to logic step 72 where a menu is displayed. The menu may request the customer to enter such data as may be deemed necessary to identify the customer. The program advances to decision step 74 where it is confirmed that all the necessary disclosure has been made or entered. In the event the customer fails to comply with the menu requirements, the program reverts back to pre logic step 72 where after a predetermined number of trials a "please contact your personal banker" message may be posted. If all the required information is entered, the program logic proceeds to logic step 76 and displays a set of menus from which the customer is asked to choose. To activate commercial depository 12, the customer would choose the commercial deposit option under logic step 88. Subsequently, a deposit process is initiated under logic step 190. After the customer enters the amount of deposit box 22 is opened for a specified period of time. The customer should be able to open box 22 and place the deposit inside within the allocated time. The program checks the "box open timer" under decision block 192. If the timer has timed out, the box is automatically locked under logic step 193. In the alternate if the timer has not timed out, the program logic advances to decision block 195 where the system is checked for a malfunction. If no malfunction is noted, the program logic reverts back to logic step 190 and the customer is required to insert his/her card and activate the "box open timer". If after a preset number of trials, the box fails to open, a "please contact the banker" message will be posted on the screen at ATM 16. In the alternate, if a system malfunction is detected, security alert is posted at the bank under logic step 196. Accordingly, after the system is checked and the problem rectified the system alarm is reset under logic step 198. Generally, customers who routinely use the commercial depository box 22 are issued a different type of card which is keyed to open box 22 via ATM 16. Thus, the customer will use the card to enter the amount of deposit and as well to open the box. Further, as described hereinabove, a bank representative is also able to open box 22, under logic step 148, remotely to allow viodeoconference customers to deposit documents which may be too large to scan.

Figure 12:
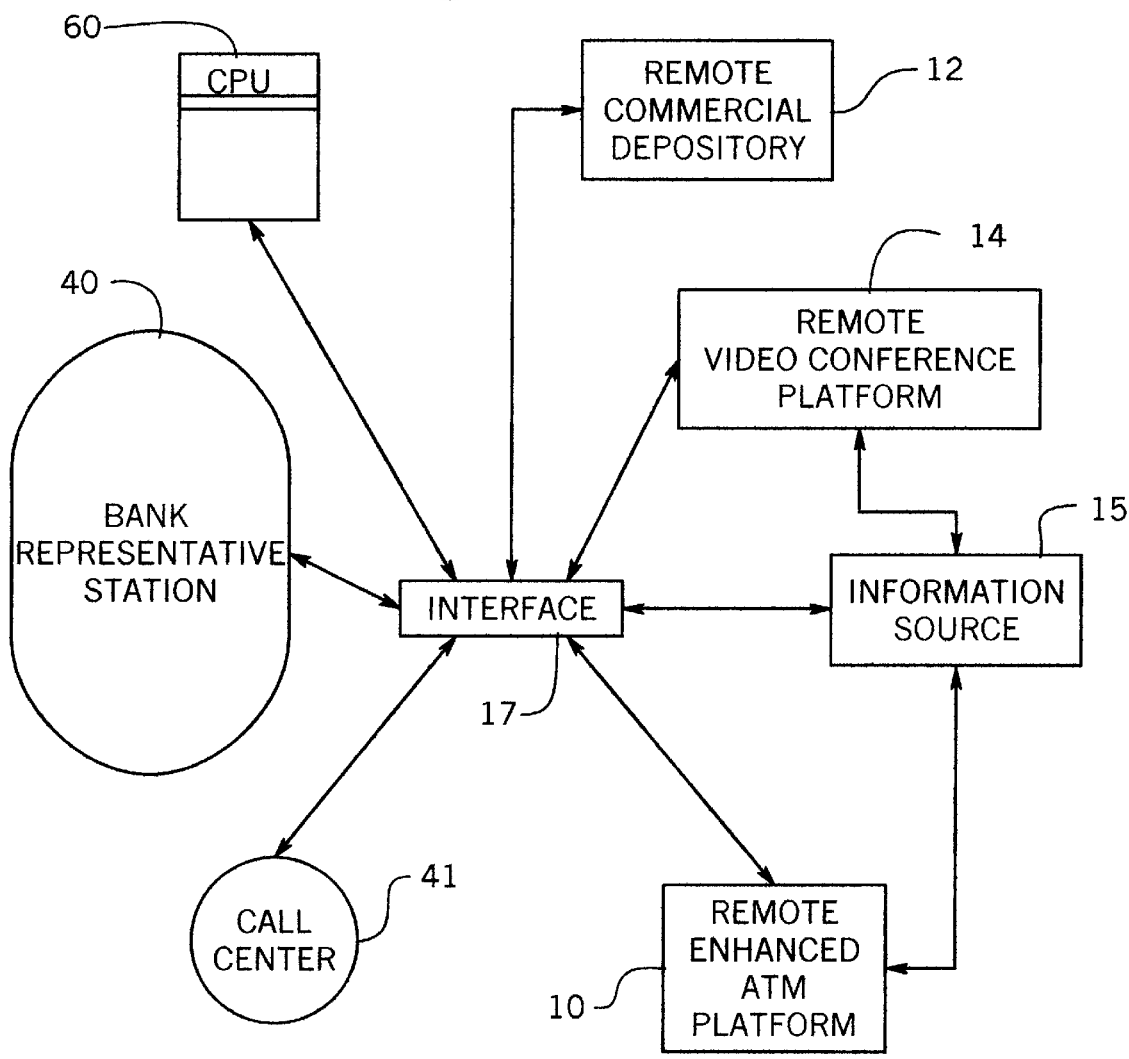
FIG. 12 is a flow chart representing the interface system and high level logic of the present invention.

Referring now to the embodiment of FIG. 12, a block diagram representing the operational interface enhanced ATM platform 10, commercial depository 12, videoconference/platform 14 and information display 15 are shown. These modules are interfaced via interface 17 which includes a data, image and software interface system with operable electronic connections to central computer 60 at the bank. Bank representative station 40 and call center 41 are also connected to interface 17. Accordingly, the modules comprising customer and bank station are integrated and structured to provide the many advantages and advances of the present invention. As discussed hereinabove, information 15 includes 3rd party information such as internet, news etc. Further it includes information from the bank, and provides access to bank related news and services. Moreover, call center 41 is a customer service or equivalent platform available to provide third party services such as insurance, travel, investment and similar services which are of general interest to the customer. For example, information source 15 may display a certain service of interest and call center 41 is able to host all orders and questions related to that service. Furthermore, the customer may interact with call center 41 via portals 18, 24 and 30 to purchase the services from the third party sponsor.

While the preferred embodiments of the present invention have been shown and described, it will be obvious to those skilled in the art that changes, variations and modifications may be made therein without departing from the present invention in its broader aspects.

Thus, although the present invention has been described with reference to preferred embodiments, workers skilled in the art will recognize that changes may be made in form and detail without departing from the spirit and scope of the invention in its broader aspects and therefor, the aim in the appended claims is to cover such changes and modifications as fall within the scope and spirit of the invention.

What is claimed is:

1. An interactive point access financial and information system that enables a customer to remotely perform financial operations and obtain information, the system comprising:
   a central computer module;
   a customer service representative module operably connected to the central computer; and
   a customer access station at a location that is remote from the central computer module and the customer service representative module, wherein the customer access station comprises:
   an automated teller module operably connected to the central computer module, wherein the automated teller module permits the customer to make withdrawals, deposits and inquiries with respect to accounts on record at the central computer module; and
   a customer module operably connected to the central computer module and the customer service representative module that enables the customer to interact in real time with a customer service representative through the customer service representative module, wherein the customer module comprises:
   a printer for printing account information and account applications on demand;
   a scanner for scanning account applications that have been completed by the customer and additional documentation needed to process the account application;
   a telephone for transmitting and receiving sound between the customer module and the customer service representative module;
   a video camera for capturing images and transmitting the images to the customer service representative module; and
   an image display for displaying images of the customer service representative.

2. The interactive point access financial and information system of claim 1, and further including an information source incorporated therewith to provide third-party information.

3. The interactive point access financial and information system of claim 1, and further including a call center incorporated therewith to enable customer interaction with third-party products and service sponsors.

4. The interactive point access financial and information system of claim 1, wherein automated teller module provides interactive menus displayable on a screen to enable the customer to execute the withdrawals, deposits and inquiries.

5. The interactive point access financial and information system of claim 1, and further comprising a depository that includes a security box that is operable via command functions at the automated teller module.

6. The interactive point access financial and information system of claim 1, and further comprising a depository that includes a security box that is operable via command functions at customer service representative module.

7. The interactive point access financial and information system of claim 1, wherein the image display includes an interactive terminal with screen-displayable menus.

8. The interactive point access financial and information system of claim 7, wherein the menu at the image display includes structured steps for cash withdrawal, balance inquiry, fund transfers, financial profile, ticket dispensing options, and operating a box at a commercial depository module that is operably attached to the customer access station.

9. The interactive point access financial and information system of claim 8, wherein the structured steps include steps for loans, deposits, services, investments, resource tools, promotions and additional services access including the option to interact with the customer service representative.

10. An interactive point access financial and information system that enables a customer to remotely perform financial operations and obtain information, the system comprising:
    a central computer module;
    a customer service representative module operably connected to the central computer; and a customer access station at a location that is remote from the central computer module and the customer service representative module, wherein the customer access station comprises:
  an automated teller module operably connected to the central computer module, wherein the automated teller module permits the customer to make withdrawals, deposits and inquiries with respect to accounts on record at the central computer module; and
  a customer module operably connected to the central computer module and the customer service representative module that enables the customer to interact in real time with a customer service representative through the customer service representative module, wherein the customer module comprises:
    printing means for printing account information and account applications on demand;
    scanning means for scanning account applications that have been completed by the customer and additional documentation needed to process the account application;
    sound transmission means for transmitting and receiving sound between the customer module and the customer service representative module;
    image capturing means for capturing and transmitting images to the customer service representative module; and
    image display means for displaying images of the customer service representative.

11. The interactive point access financial and information system of claim 10, and further including an information source incorporated therewith to provide third-party information.

12. The interactive point access financial and information system of claim 10, wherein the image display includes an interactive terminal with screen-displayable menus.

13. The interactive point access financial and information system of claim 12, wherein the menu at the image display includes structured steps for cash withdrawal, balance inquiry, fund transfers, financial profile, ticket dispensing options, and operating a box at a commercial depository module that is operably attached to the customer access station.

14. The interactive point access financial and information system of claim 13, wherein the structured steps include steps for loans, deposits, services, investments, resource tools, promotions and additional services access including the option to interact with the customer service representative.

15. A method of enabling a customer to remotely perform financial operations and obtain information, the method comprising:
  providing a central computer module;
  operably connecting a customer service representative module to the central computer module;
  operably connecting an automated teller module to the central computer module, wherein the automated teller module permits the customer to make withdrawals, deposits and inquiries with respect to accounts on record at the central computer module;
  operably connecting a customer module to the central computer module and the customer service representative module that enables the customer to interact in real time with a customer service representative through the customer service representative module, wherein the customer module at a location that is remote from the central computer module and the customer service representative module;
  printing, at the customer module, account information documentation and account applications on demand;
  scanning, at the customer module, account applications that have been completed by the customer and additional documentation needed to process the account application;
  transmitting and receiving sound between the customer module and the customer service representative module;
  capturing images and transmitting the images to the customer service representative module; and
  displaying images of the customer service representative.

16. The method of claim 15, and further comprising operably connecting a commercial depository to the automated teller module.

17. The method of claim 15, and further comprising displaying menus associated with the operation of the customer module.

18. The method of claim 17, wherein displaying menus includes displaying structured steps for cash withdrawal, balance inquiry, fund transfers, financial profile, ticket dispensing options, and operating a box at a commercial depository module that is operably attached to the customer module.

19. The method of claim 18, wherein displaying structured steps includes displaying steps for loans, deposits, services, investments, resource tools, promotions and additional services access including the option to interact with the customer service representative.

\* \* \* \* \*

UNITED STATES PATENT AND TRADEMARK OFFICE
CERTIFICATE OF CORRECTION

PATENT NO.    : 6,223,983 B1
DATED         : May 1, 2001
INVENTOR(S)   : Kjonaas et al.

Page 1 of 1

It is certified that error appears in the above-identified patent and that said Letters Patent is hereby corrected as shown below:

Column 2,
Line 45, "check$^{SM}$" should be initially capitalized.

Column 3,
Line 5, delete "application" and insert -- applications --.
Line 8, delete "incorporate" and insert -- incorporates --.

Column 6,
Line 6, delete "3rd" and insert -- third --.
Line 9, delete "NCB" and insert -- National City Bank (NCB) --.
Line 12, delete "over ride" and insert -- override --.
Line 15-16, delete "National City Bank (NCB)" and insert -- NCB --.

Column 8,
Line 39, delete "th e" and insert -- the --.

Column 9,
Line 2, delete "are" and insert -- it --.

Signed and Sealed this

Eighth Day of January, 2002

Attest:

*Attesting Officer*

JAMES E. ROGAN
*Director of the United States Patent and Trademark Office*